US011081302B2

(12) United States Patent
Henck

(10) Patent No.: US 11,081,302 B2
(45) Date of Patent: *Aug. 3, 2021

(54) BATTERY DISCONNECT DEVICE

(71) Applicant: Joyson Safety Systems Acquisition LLC, Auburn Hills, MI (US)

(72) Inventor: Jeremy Henck, White Lake, MI (US)

(73) Assignee: Joyson Safety Systems Acquisition LLC, Auburn Hills, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 16/449,995

(22) Filed: Jun. 24, 2019

(65) Prior Publication Data

US 2019/0311869 A1 Oct. 10, 2019

Related U.S. Application Data

(62) Division of application No. 15/639,710, filed on Jun. 30, 2017, now Pat. No. 10,373,788.

(Continued)

(51) Int. Cl.
*H01H 9/16* (2006.01)
*H01H 39/00* (2006.01)
(Continued)

(52) U.S. Cl.
CPC ............ *H01H 39/006* (2013.01); *H01H 9/16* (2013.01); *H01M 50/10* (2021.01);
(Continued)

(58) Field of Classification Search
CPC ........... H01H 39/006; H01H 2039/008; H01H 21/18; H01H 21/28; H01H 21/282; H01H 21/285; H01M 2/202
See application file for complete search history.

(56) References Cited

U.S. PATENT DOCUMENTS 6,222,439 B1 4/2001 Tanigawa et al.
6,797,904 B1 9/2004 Ni
(Continued)

FOREIGN PATENT DOCUMENTS

JP 11-180232 A 7/1999
WO 2013-132598 A1 9/2013

OTHER PUBLICATIONS

International Search Report and Written Opinion received in International Application No. PCT/US2017/040400, dated Sep. 14, 2017.

*Primary Examiner* — Felix O Figueroa
(74) *Attorney, Agent, or Firm* — Meunier Carlin & Curfman LLC

(57) ABSTRACT

Various implementations include a battery disconnect device that includes a breaker, a housing, and a bus bar. The breaker has a pivot portion and an actuation portion, and the actuation portion has an actuation face. The pivot portion has an axis of rotation about which the breaker is pivotable. The housing defines a chamber, and the chamber is in fluid communication with a gas generator via an inlet defined by an inlet wall of the housing. The breaker is disposed within the chamber in a first position in which the actuation face is adjacent the inlet and inlet wall and combustion gas from the gas generator pushes on the actuation face to cause the breaker to pivot about the axis of rotation of the pivot portion to a second position, which causes the breaker to break the bus bar.

15 Claims, 24 Drawing Sheets

Related U.S. Application Data

(60) Provisional application No. 62/356,945, filed on Jun. 30, 2016.

(51) Int. Cl.
   *H01M 50/10*  (2021.01)
   *H01M 50/502* (2021.01)
   *H01M 50/572* (2021.01)

(52) U.S. Cl.
   CPC ....... *H01M 50/502* (2021.01); *H01M 50/572* (2021.01); *H01H 2039/008* (2013.01); *H01H 2219/028* (2013.01); *H01M 2220/20* (2013.01)

(56) References Cited

U.S. PATENT DOCUMENTS

| | | |
|---|---|---|
| 6,946,608 B2 | 9/2005 | Brede et al. |
| 7,182,012 B2 | 2/2007 | Brede et al. |
| 8,432,246 B2 | 4/2013 | Suzuki et al. |
| 9,221,343 B2 | 12/2015 | Tokarz et al. |
| 9,236,208 B2 | 1/2016 | Ukon et al. |
| 10,373,788 B2 * | 8/2019 | Henck .................. H01M 2/206 |
| 2005/0023116 A1 | 2/2005 | Kordel et al. |
| 2014/0083825 A1 | 3/2014 | Fukuyama et al. |

* cited by examiner

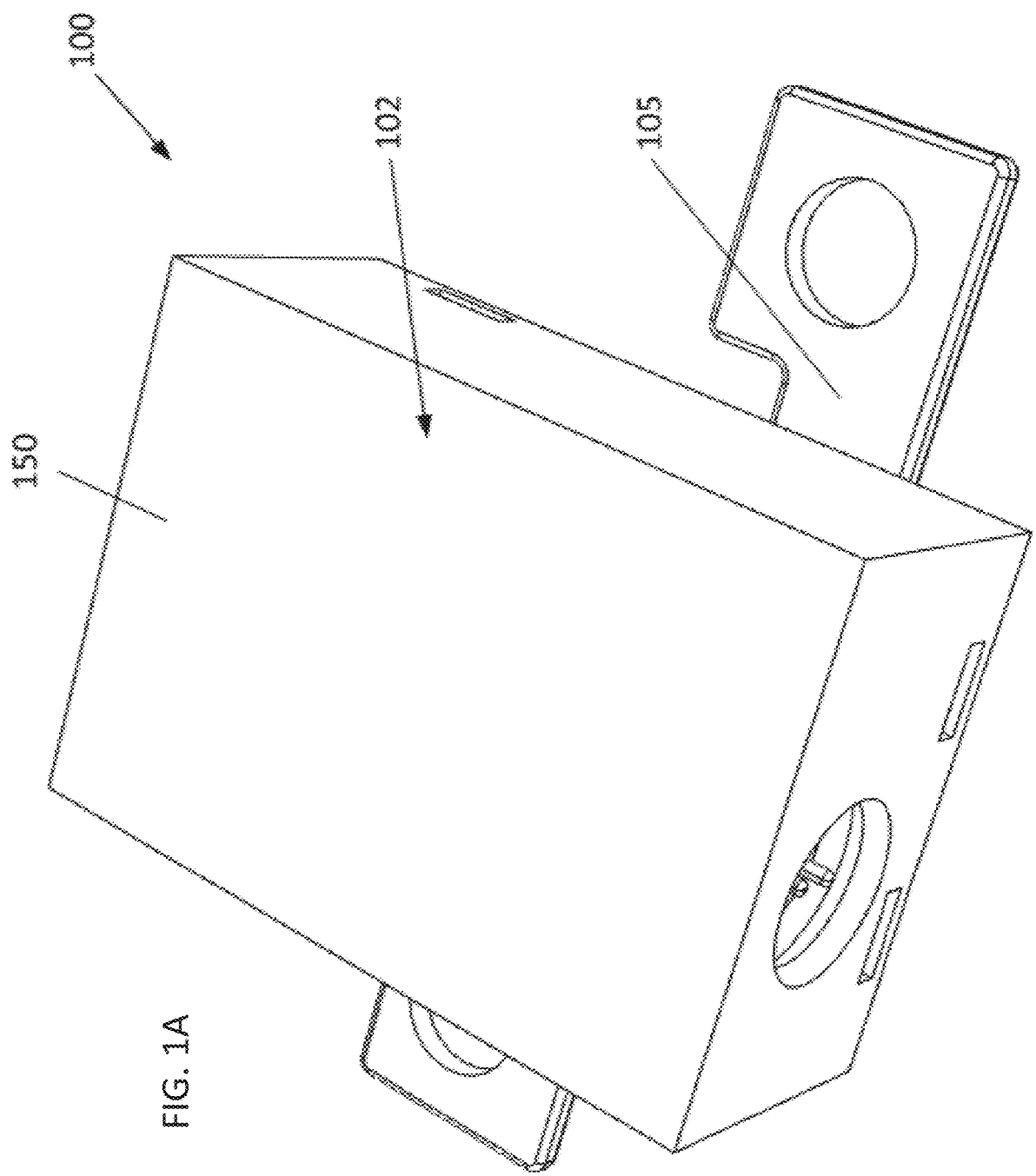

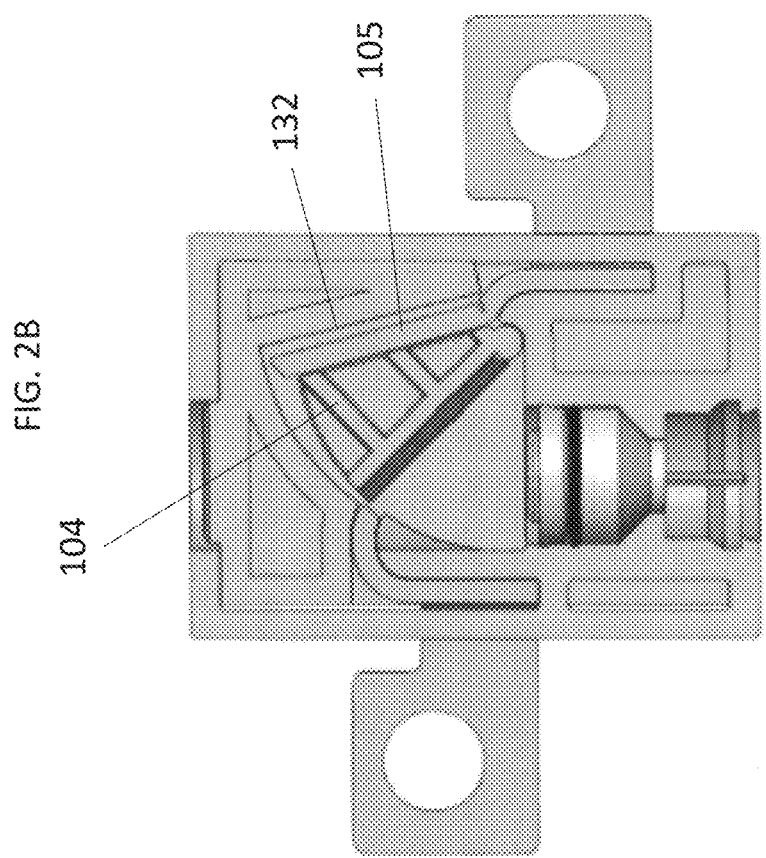

BATTERY DISCONNECT DEVICE

CROSS REFERENCE TO RELATED APPLICATION

This application is a divisional of application Ser. No. 15/639,710, entitled "Battery Disconnect Device," filed Jun. 30, 2017, which claims priority to U.S. Patent Application No. 62/356,945, entitled "Battery Disconnect Device," filed Jun. 30, 2016, the content of which are herein incorporated by reference in their entirety.

BACKGROUND

Disconnect devices may be included in vehicles to disconnect the battery during an accident to ensure that no electrical cables are shorted during and after the accident and to protect on board electrical systems downstream of the disconnect device. Most known disconnect devices include a piston style cutting device to break and separate a bus bar. The piston style cutting devices are actuated by a gas generator (e.g., pyrotechnic initiator). The piston style cutting devices typically have a blade that shears the bus bar in a predetermined spot.

In addition, current disconnect devices do not provide an ability for emergency personnel and others to visually determine whether the bus bar has been broken, which can present a hazard to the emergency personnel or others attending to the accident.

BRIEF SUMMARY

Various implementations include a battery disconnect device that includes a breaker, a housing, and a bus bar. The breaker has a pivot portion and an actuation portion. The actuation portion has an actuation face, and the pivot portion has an axis of rotation about which the breaker is pivotable. The housing defines a chamber, and the chamber is in fluid communication with a gas generator via an inlet defined by an inlet wall of the housing. The bus bar extends through the housing and the chamber. The breaker is disposed within the chamber in a first position in which the actuation face is adjacent the inlet and inlet wall and combustion gas from the gas generator pushes on the actuation face to cause the breaker to pivot about the axis of rotation of the pivot portion to a second position. In the second position, the actuation face is spaced apart from the inlet and inlet wall, and the pivoting movement of the pivot portion causes the breaker to break the bus bar.

In some implementations, the bus bar extends through a groove defined in the pivot portion of the breaker, and the pivoting movement of the pivot portion causes the pivot portion to break the bus bar at a first recessed portion and a second recessed portion. In a further implementation, the groove has first and second walls that are spaced apart from each other. An edge of the first wall and a cylindrical wall of the pivot portion define a first axial groove, and an edge of the second wall and the cylindrical wall define a second axial groove, wherein the first axial groove and the second axial groove are circumferentially spaced apart from each other. In a further or alternative implementation, the groove has a floor, and one edge of the bus bar is disposed adjacent the groove floor.

In some implementations, the pivot portion has a first axial face and a second axial face, and the housing defines a first recess on a first wall and a second recess on a second wall. The first wall and the second wall are spaced apart from each other, and at least a portion of the first axial face is engaged in the first recess and at least a portion of the second axial face is engaged in the second recess. In a further implementation, at least one of the first recess or the second recess is an opening in the respective first or second wall of the housing, and the respective first or second axial face is visible through the opening from outside the housing. In a further implementation, the visible first or second axial face includes an indicator thereon, and the indicator indicates whether the breaker is in the first position or the second position.

In some implementations, the housing includes a wall that defines an opening, and at least a portion of the bus bar and/or breaker is visible through the opening.

In some implementations, the pivot portion is cylindrically shaped, and the actuation portion extends from a portion of a cylindrical wall of the cylindrically shaped pivot portion. In certain implementations, the actuation portion is wedge shaped and tapers in a radially outward direction from the cylindrical wall. However, in other implementations, the actuation portion is wedge shaped and tapers in a radially inward direction toward the cylindrical wall.

In some implementations having a wedge shaped actuation portion tapering in a radially inward direction, the bus bar includes a disconnect portion that defines a first recessed portion that is adjacent the pivot portion. The actuation portion includes a second face that is spaced apart from the actuation face, and the first recessed portion faces away from the second face of the actuation portion of the breaker. A portion of the disconnect portion of the bus bar bends about the first recessed portion in response to the pivoting of the breaker from the first position to the second position. In addition, in a further implementation, the disconnect portion defines a second recessed portion facing the second face of the breaker, wherein the first and second recessed portions face opposite directions and are spaced apart from each other along a length of the disconnect portion of the bus bar. The bus bar breaks at the second recessed portion in response to the pivoting of the breaker from the first position to the second position. In some implementations, the second recessed portion defines a V-shaped stress riser, and the first recessed portion defines a U-shaped recessed portion.

In another implementation having a wedge shaped actuation portion tapering in a radially inward direction, the bus bar includes a disconnect portion that defines a recessed portion, such as the second recessed portion described above that faces the second face of the actuation portion of the breaker, and the bus bar breaks at the recessed portion in response to the pivoting of the breaker from the first position to the second position. In some implementations, the recessed portion defines a V-shaped stress riser.

In some implementations, the battery disconnect device further includes a gasket disposed between the actuation face and the inlet wall.

In some implementations, the bus bar includes a first lead and a second lead, and the first and second leads extend outwardly relative to an external surface of the housing.

In some implementations, the actuation face lies in a first plane and a second face lies in a second plane. The inlet wall of the chamber lies in a third plane, and the housing further includes a stop wall that lies in a fourth plane and an arcuate shaped wall disposed between the stop wall and the inlet wall. The third and fourth planes intersect opposite the arcuate shaped wall of the housing. The breaker includes an arcuate shaped face extending between the actuation face and the second face, and the arcuate shaped face is opposite and spaced apart from the pivot portion. The arcuate shaped wall of the chamber faces the arcuate shaped face of the breaker. The pivot portion of the breaker is disposed adjacent the intersection of the third and fourth planes. In a further implementation, the arcuate shaped face of the breaker includes at least one tooth that extends away from the arcuate shaped face. The tooth engages the arcuate shaped wall after the breaker rotates from the first position to the second position to prevent rotation from the second position to the first position. In a further implementation, the at least one tooth comprises a first plurality of teeth and the arcuate shaped wall defines a second plurality of teeth that extend away from the arcuate shaped wall and engage the first plurality of teeth after the breaker rotates from the first position to the second position to prevent rotation from the second position to the first position.

In some implementations, the arcuate shaped wall includes a first portion and a second portion. The first portion of the arcuate shaped wall extends from the inlet wall, and the second portion of the arcuate shaped wall extends from the stop wall. The distal ends of the first and second portions define a first gap therebetween through which a first end portion of the bus bar extends.

In some implementations, the bus bar includes a first end portion extending between a first lead and the disconnect portion. The first lead extends outwardly relative to an external surface of the housing, and the first end portion extends through the first gap.

In some implementations, the housing defines an arcuate shaped lip extending from the inlet wall toward the stop wall. The lip is spaced apart from and facing opposite the arcuate shaped wall, and the pivot portion of the wedge shaped breaker engages the arcuate shaped lip in the first and second positions. In a further implementation, the arcuate shaped lip and the stop wall define a second gap therebetween, and the bus bar includes a second end portion extending between a second lead and the disconnect portion. The second lead extends outwardly relative to the external surface of the housing, and the second end portion extends through the second gap.

In some implementations, an angle of intersection of the first and second planes is less than 90°. For example, in one implementation, the angle of intersection of the first and second planes is between 30° and 45°.

In other various implementations, a battery disconnect device includes a breaker, a housing, and a bus bar. The breaker has an indicator on a portion thereof. The housing defines a chamber, and the breaker is disposed in the chamber. The bus bar is disposed through the housing. Combustion gas from a gas generator causes the breaker to move from a first position to a second position, wherein movement from the first position to the second position causes the breaker to break the bus bar into at least two separate pieces, and the indicator is visible from an external surface of the housing when the breaker is in the second position.

In some implementations, the indicator is visible from the external surface of the housing when the breaker is in the first position. In certain implementations, the indicator is a tab that extends from an external surface of the breaker, and the tab moves with the breaker from the first position to the second position. The tab is visible from the external surface of the housing through a window defined by the external surface of the housing. In a further implementation, the window is a slot, and the tab moves through the slot from the first position to the second position. In another implementation, the tab is an axial face of a pivot portion of the breaker, and the tab includes an indicator that rotates with the pivot portion about an axis of rotation R-R of the pivot portion to indicate whether the breaker is in the first position or the second position.

In other various implementations, a battery disconnect device includes a breaker, a housing, and bus bar. The housing defines a chamber, and the breaker is disposed in the chamber. The bus bar is disposed through the housing. Combustion gas from a gas generator causes the breaker to move from a first position to a second position, and movement from the first position to the second position causes the breaker to break the bus bar into at least two separate pieces. The housing defines a window through which at least a portion of the breaker and/or the bus bar is visible from an external surface of the housing when the breaker is in the first and/or second position.

BRIEF DESCRIPTION OF THE DRAWINGS

Various implementations are explained in even greater detail in the following exemplary drawings. The drawings are merely exemplary to illustrate the structure of the implementations and certain features that may be used singularly or in combination with other features. The invention should not be limited to the implementations shown.

FIGS. 1A and 1B illustrate upper and lower perspective views of a battery disconnect device according to one implementation.

FIG. 2B illustrates a plan view of components disposed within the battery disconnect device shown in FIG. 2A in the deployed position.

DETAILED DESCRIPTION

Figure 1B:
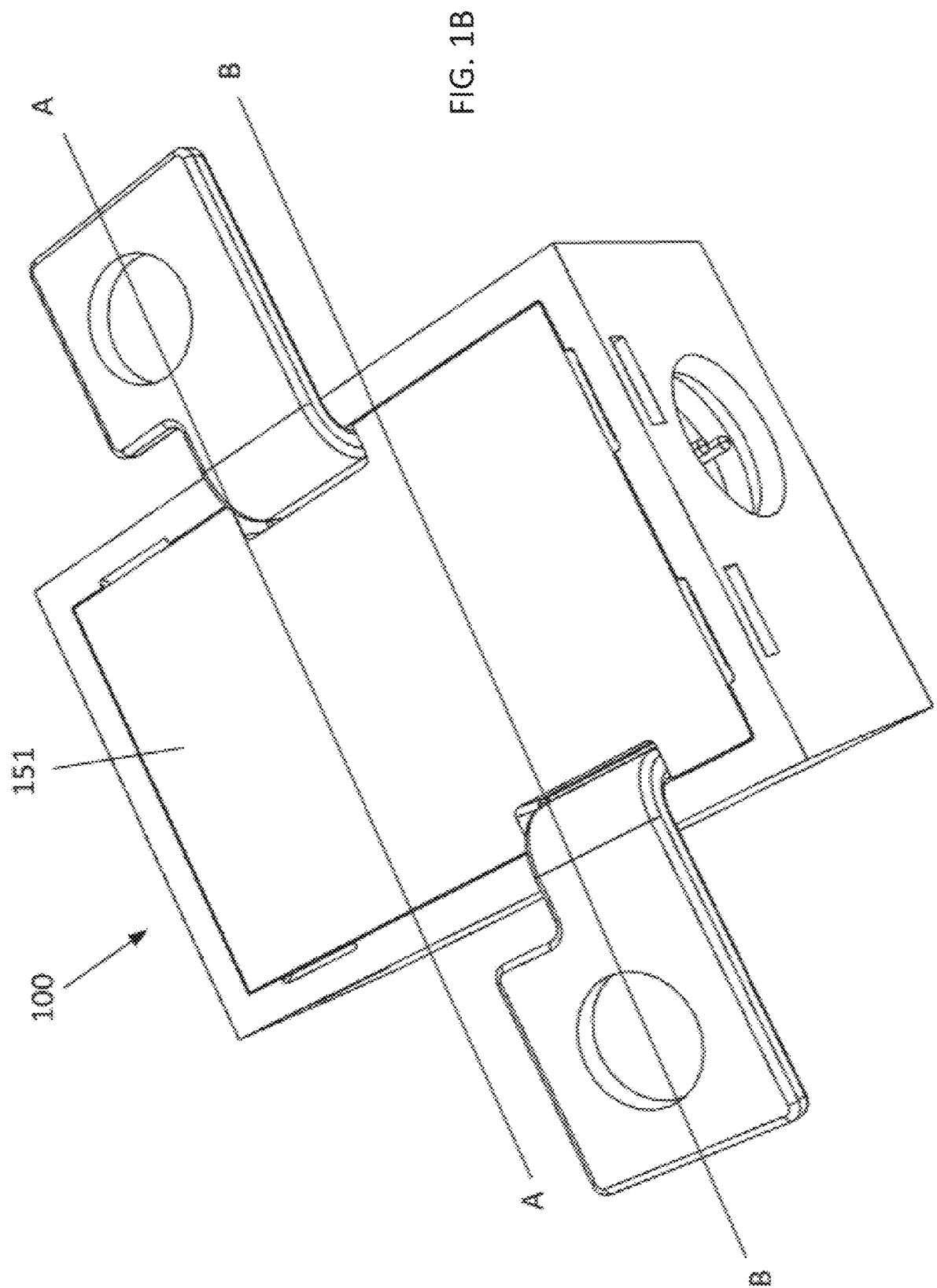

Various implementations include a battery disconnect device that includes a breaker, a housing, and a bus bar. The breaker has a pivot portion and an actuation portion, and the actuation portion has an actuation face. The pivot portion has an axis of rotation about which the breaker is pivotable. The housing defines a chamber, and the chamber is in fluid communication with a gas generator via an inlet defined by an inlet wall of the housing. And, the bus bar extends through the housing and the chamber. The breaker is disposed within the chamber in a first position in which the actuation face is adjacent the inlet and inlet wall and combustion gas from the gas generator pushes on the actuation face to cause the breaker to pivot about the axis of rotation of the pivot portion to a second position. In the second position, the actuation face is spaced apart from the inlet and inlet wall, and the pivoting movement of the pivot portion causes the breaker to break the bus bar.

In addition, other various implementations include a battery disconnect device that includes a breaker, a housing, and a bus bar. The breaker has an indicator on a portion thereof. The housing defines a chamber, and the breaker is disposed in the chamber. And, the bus bar is disposed through the housing. The combustion gas from a gas generator causes the breaker to move from a first position to a second position, and movement from the first position to the second position causes the breaker to break the bus bar into at least two separate pieces. The indicator is visible from an external surface of the housing when the breaker is in the second position.

Furthermore, other various implementations include a battery disconnect device that includes a breaker, a housing, and a bus bar. The housing defines a chamber, and the breaker is disposed in the chamber. The bus bar is disposed through the housing. Combustion gas from a gas generator causes the breaker to move from a first position to a second position, and movement from the first position to the second position causes the breaker to break the bus bar into at least two separate pieces. The housing defines a window through which at least a portion of the breaker and/or the bus bar is visible from an external surface of the housing when the breaker is in the first and/or second position.

FIGS. 1A-3 illustrate an exemplary battery disconnect device according to one implementation. The battery disconnect device 100 includes a housing 102, a breaker 104, and a bus bar 105. The housing 102 and breaker 104 are formed from materials that are not electrically conductive (e.g., a polymer or glass filled polymer (e.g., glass filled nylon), and the bus bar 105 is a conductive material (e.g., metal, composite with metal).

The housing 102 includes an inlet wall 112, a stop wall 132, and an arcuate shaped wall 134. A chamber 106 within the housing 102 is defined at least in part by the inlet wall 112, the stop wall 132, the arcuate shaped wall 134, and side walls 150, 151 of the housing 102. At least a portion of the inlet wall 112 lies within a first plane, and at least a portion of the stop wall 132 lies within a second plane that intersects the first plane. And, the arcuate shaped wall 134 is disposed between the stop wall 132 and the inlet wall 112 opposite the intersection of the first and second planes. The inlet wall 112 defines an inlet 110, and a gas generator 108 (e.g., an initiator or micro gas generator (MGG)) is in fluid communication with the chamber 106 via the inlet 110. An arcuate shaped lip 142 extends from the inlet wall 112 toward the stop wall 132, and a gap is defined between the lip 142 and the stop wall 132. The lip 142 is spaced apart from and faces opposite the arcuate shaped wall 134. In addition, the lip 142 is adjacent the intersection of the first and second planes.

The arcuate shaped wall 134 includes a first arcuate shaped wall portion 134a that extends from the inlet wall 112 and a second arcuate shaped wall portion 134b that extends from the stop wall 132. The first arcuate shaped wall portion 134a and second arcuate shaped wall portion 134b define a gap between the distal ends thereof. In other implementations (not shown), the arcuate shaped wall 134 may include one of the first arcuate shaped wall portion 134a or the second arcuate shaped wall portion 134b.

The breaker 104 has an actuation portion 111 and a pivot portion 118. The actuation portion 111 includes a first face 114 that lies in a third plane, a second face 116 that lies in a fourth plane, and an arcuate shaped face 136 opposite the pivot portion 118. The actuation portion 111 is wedge shaped and tapers radially inwardly toward the pivot portion 118. An angle of intersection of the third and fourth planes is between 30° and 45°. The first face 114 and the second face 116 each have first edges 144a, 144b, respectively, that are spaced apart from each other a first distance and second edges 145a, 145b, respectively, that are spaced apart from each other a second distance that is less than the first distance. The arcuate shaped face 136 extends between the first edges 144a, 144b of the first face 114 and the second face 116. The pivot portion 118 extends between the second edges 145a, 145b of the first face 114 and the second face 116, and the pivot portion 118 is opposite and spaced apart from the arcuate shaped face 136 and is adjacent an intersection of the third and fourth planes. In the implementations shown in FIGS. 2A through 3, the pivot portion 118 has an arcuate shape. In other implementations, the angle of intersection may be less than 90°. In addition, in other implementations, the pivot portion 118 and/or the face extending between the first face 114 and the second face 116 may have a non-arcuate shape.

The bus bar 105 includes an interior portion 122 disposed within the chamber 106 and electrical connection leads 124a, 124b that are disposed externally of the chamber 106. The interior portion 122 includes a first end portion 146, a second end portion 147, and a disconnect portion 120 that extends between the first end portion 146 and the second end portion 147. The disconnect portion 120 defines a first recessed portion 128 and a second recessed portion 121. The first recessed portion 128 and the second recessed portion 121 are defined on surfaces of the bus bar 105 that face opposite directions and are spaced apart from each other, and the recessed portions 128, 121 are spaced apart along a length of the disconnect portion 120 of the bus bar 105 (i.e., the direction extending between the first end portion 146 and the second end portion 147). In the implementation shown in FIGS. 2A through 3, the second recessed portion 121 defines a v-shaped stress riser, or groove, and the first recessed portion 128 defines a U-shaped recessed portion. However, in other implementations, the recessed portions 121, 128 may define recessed portions having other shapes. In addition, in some implementations (not shown), the bus bar 105 may include the first recessed portion 128 or the second recessed portion 121 and not the other.

The leads 124a, 124b extend through and away from side wall 151 of the housing 102. Each of the leads 124a, 124b extends through the side wall 151 of the housing 102 and turns outwardly to extend past a footprint of the housing 102 such that distal ends of the leads 124a, 124b lie in a plane that is parallel with the side wall 151 of the housing 102. Axis A-A within this plane extends centrally through lead 124a, and axis B-B within this plane extends centrally through lead 124b. Axis A-A and axis B-B are parallel and spaced apart from each other.

The first end portion 146 extends from a proximal end of lead 124a and the second end portion 147 extends from a proximal end of lead 124b. The first 146 and second end portions 147 lie in separate planes that are spaced apart from and are parallel to each other and are perpendicular to the plane that include the distal ends of the leads 124a, 124b. The disconnect portion 120, which extends between the first 146 and second end portions 147, lies in a plane that intersects the planes in which the end portions 146, 147 lie. For example, in some implementations, the plane in which the disconnect portion 120 lies intersects the planes in which first 146 and second end portions 147 lie at an angle of between 30° and 45°. In other implementations, the angle may be less than 90° and may correspond to the angle at which the third and fourth planes of the breaker 104 intersect.

Figure 2A:
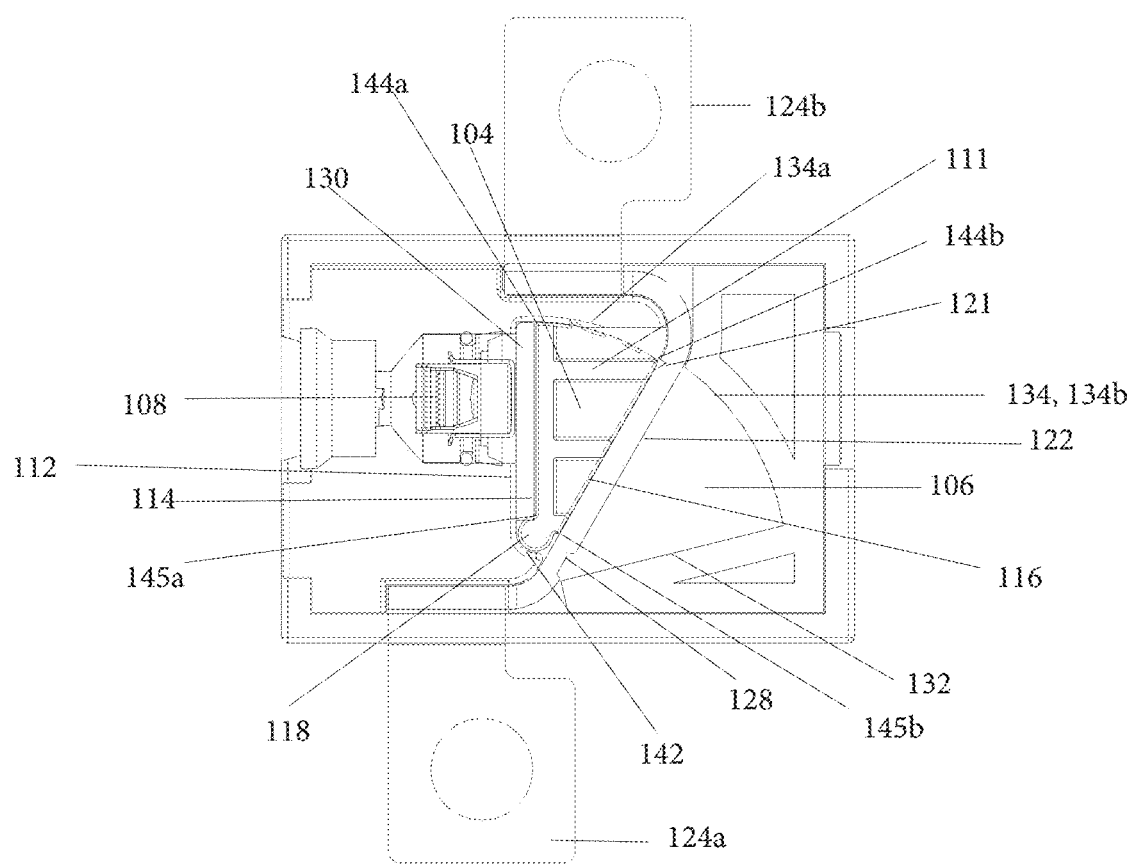
FIG. 2A illustrates a plan view of components disposed within the battery disconnect device shown in FIGS. 1A and 1B in the non-deployed position.
Figure 3:
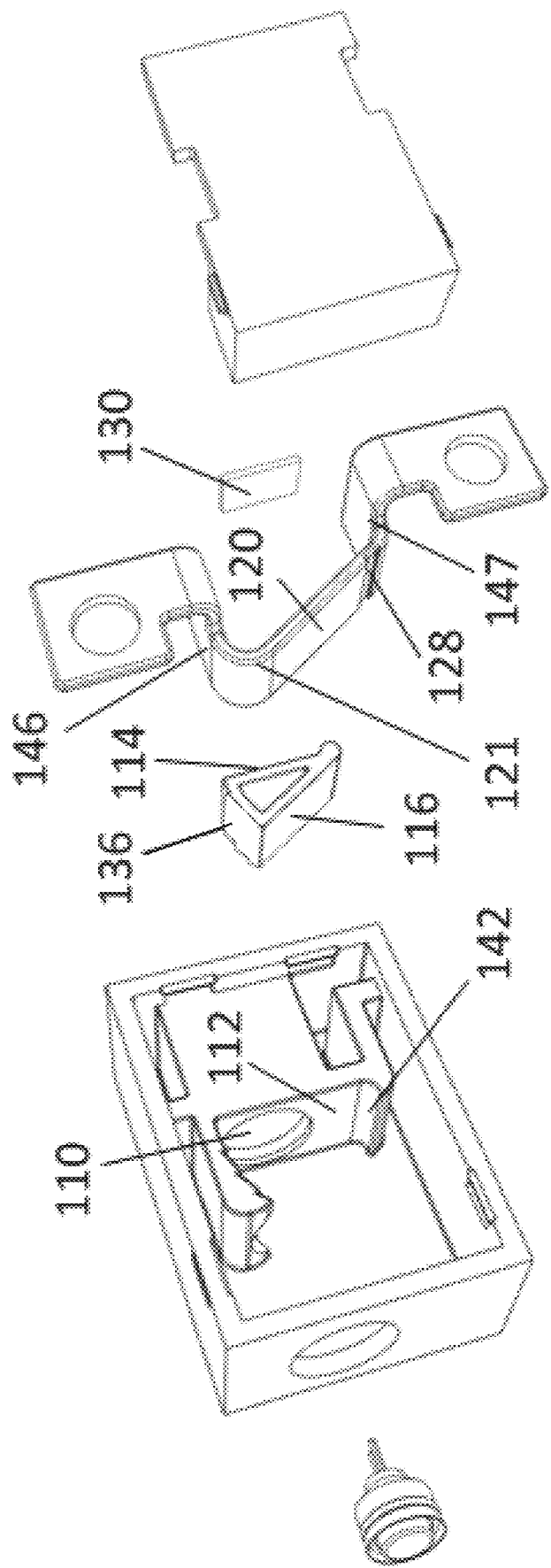
FIG. 3 illustrates an exploded view of the components of the battery disconnect device shown in FIGS. 1A through 2B.

FIGS. 2A and 2B illustrate the breaker 104 and bus bar 105 assembled within the chamber 106 of the housing 102. The disconnect portion 120 of the bus bar 105 extends through the chamber 106, and the leads 124a, 124b extend from the side wall 151 of the housing 102. The first end portion 146 of the bus bar 105 extends through the gap defined between the inlet wall 112 and the stop wall 132, and the second end portion 147 of the bus bar 105 extends through the gap defined between distal ends of the first arcuate shaped wall portion 134a and second arcuate shaped wall portion 134b. And, in some implementations (not shown), the leads may extend through and from another external surface of the housing 102 than side wall 151.

The breaker 104 is disposed within the chamber 106 between the inlet wall 112 and the bus bar 105 in the first, or non-deployed, position, which is shown in FIG. 2A. In this first position, the first face 114 of the actuation portion 111 faces the inlet 110 and the inlet wall 112 of the housing 102, the second face 116 faces the disconnect portion 120 of the bus bar 105, and the arcuate shaped face 136 of the breaker 104 faces the first arcuate shaped wall portion 134a. In addition, the pivot portion 118 of the breaker 104 engages the arcuate shaped lip 142.

Combustion gas from the gas generator 108 forces the breaker 104 to pivot about an axis of rotation R-R of the pivot portion 118 from the first, or non-deployed, position shown in FIG. 2A to the second, or deployed, position shown in FIG. 2B, and the pivoting causes the second face 116 of the breaker 104 to break the disconnect portion 120 of the bus bar 105 at the second recessed portion 121.

In the second position, the first face 114 is spaced apart from the inlet 110 and inlet wall 112, and the second face 116 is disposed adjacent the stop wall 132. In addition, the arcuate shaped face 136 faces the second arcuate shaped wall portion 134b. The portion of the bus bar 105 between the recessed portions 128, 121 is bent about the second recessed portion 121 and is disposed between the second face 116 and the stop wall 132 in the deployed position.

The battery disconnect device 100 also includes a gasket 130 that is disposed between the first face 114 of the breaker 104 and the inlet wall 112. The gasket 130 prevents leakage of gas from the gas generator 108 past the first face 114 of the breaker 104.

Figure 4:
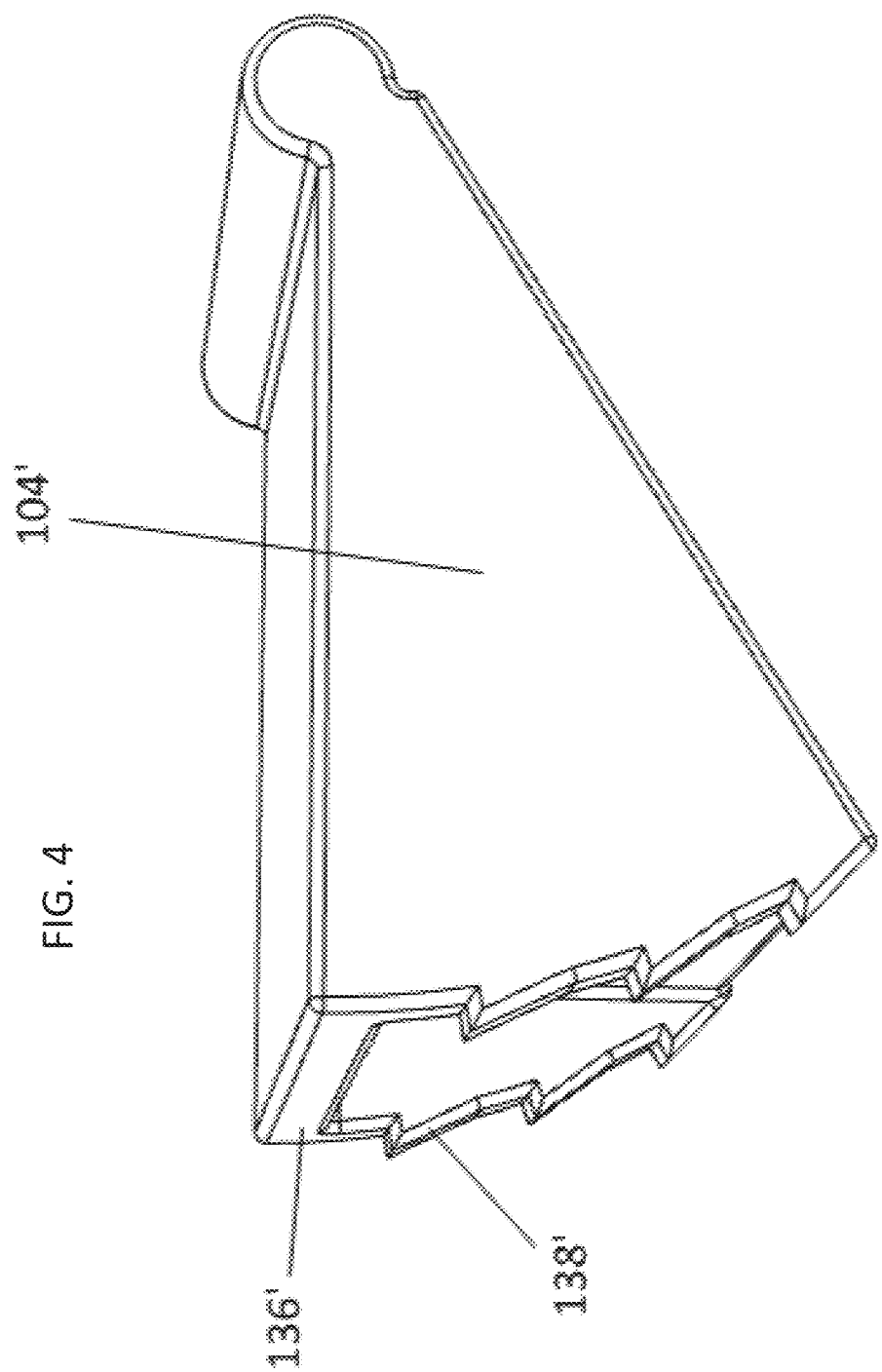
FIG. 4 illustrates a partial perspective view of a breaker according to another implementation.

In the implementation shown in FIG. 4, the arcuate shaped face 136' of the breaker 104' includes teeth 138' to prevent rotation from the second position to the first position. The teeth 138' extend radially outwardly from the arcuate shaped face 136' and are angled such that they slide past the arcuate shaped wall 134 when the breaker 104 rotates from the first position to the second position and engage the arcuate shaped wall 134 in response to rotation or attempted rotation from the second position toward the first position.

Figure 5:
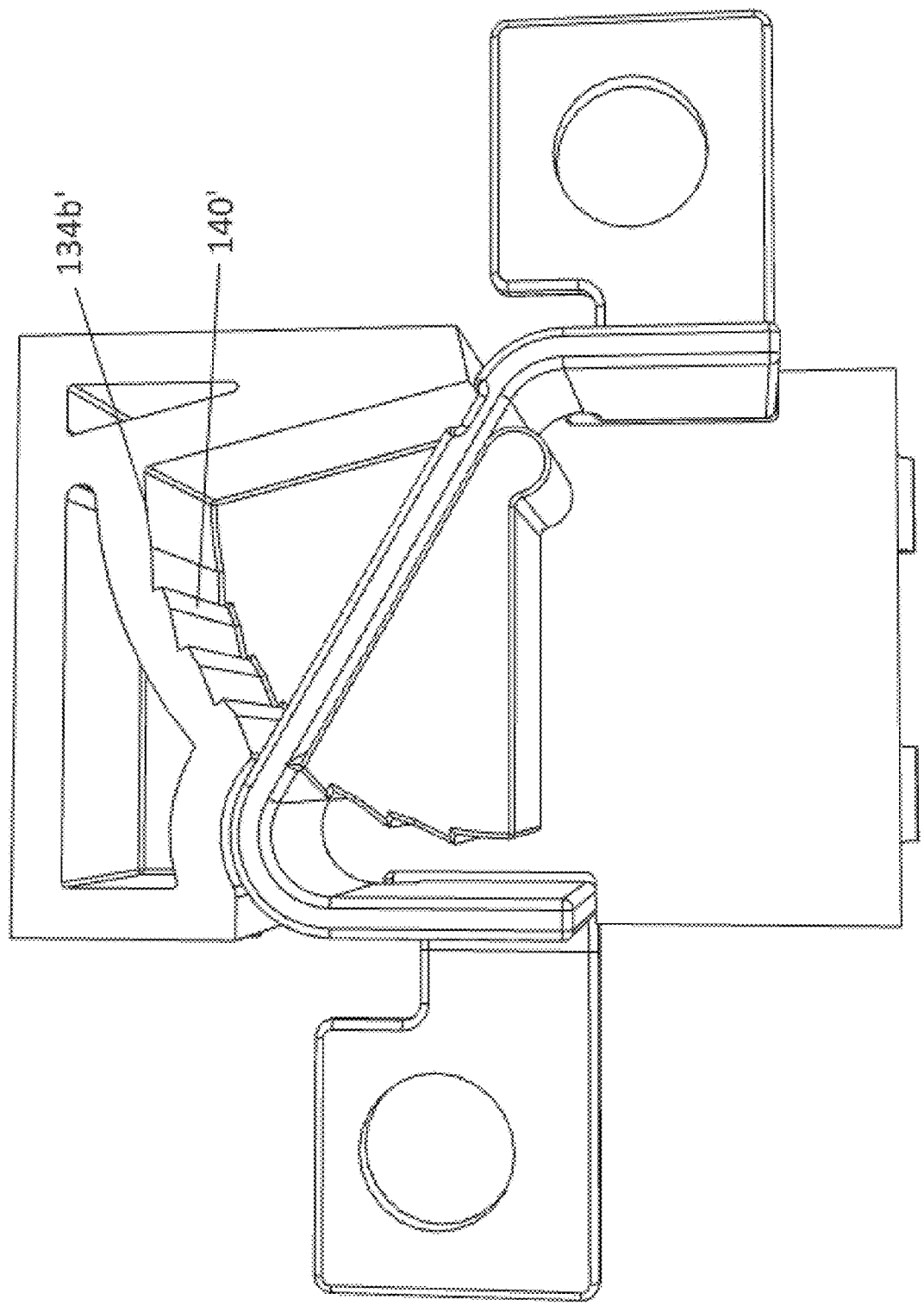
FIG. 5 illustrates a plan view of the breaker shown in FIG. 4 disposed within a battery disconnect device according to another implementation.

In the implementation shown in FIG. 5, the arcuate shaped wall portion 134b' also includes teeth 140' that extend radially inwardly from the arcuate shaped wall portion 134b' and are angled such that the teeth 138' can slide past the teeth 140' when the breaker 104' moves from the first position to the second position. The teeth 140' from the arcuate shaped wall portion 134b' engage the teeth 138' from the arcuate shaped face 136' in response to movement or attempted movement from the second position toward the first position to prevent rotation in this direction. The teeth 140' also decelerate the breaker 104', which further prevents bounce back of the breaker 104' in the direction from the second position to the first position. Although not shown, the first arcuate shaped wall portion may also include teeth, such as teeth 140'.

In the implementation shown in FIGS. 6-10, the battery disconnect device 200 includes a breaker 204, housing having a first housing portion 202a and a second housing portion 202b, and a bus bar, such as bus bar 105. The breaker 204 includes a pivot portion 218 and an actuation portion 211. Axial faces of pivot portion 218 include first and second pin portions 219a, 219b that extend from each side of the pivot portion 218 along rotational axis R-R of the pivot portion 218. The actuation portion 211 includes first face 214, a second face 216, and an arcuate shaped face 236 that extends between the first face 214 and the second face 216 and is spaced apart and opposite the pivot portion 218.

In the implementation described in relation to FIGS. 1-5, the second face 116 of the breaker 104 is relatively flat. Thus, the entire area of the second face 116 of the breaker 104 applies the actuation force to the bus bar 105. However, in the implementation shown in FIGS. 6-10, the second face 216 provides at least two concentrated load areas for applying the actuation force to the bus bar 105. In the implementation shown in FIGS. 6-10, the concentrated load areas are provided by the area 216a between peripheral edges 285c, 285d of a triangular shaped groove 285 defined by the second face 216 and peripheral edges 216b, 216c of the second face 216. The triangular shaped groove 285 is triangular shaped as viewed from a plan view of the second face 216, and the groove 285 is further defined by two triangular shaped faces 285a, 285b. The apices of the faces 285a, 285b are spaced apart from a distal end of the second face 216 and meet at a single point. In other words, the groove 285 tapers from the arcuate shaped face 236 toward the pivot portion 218 and tapers from the second face 216 toward the first face 214. The peripheral edges 285c, 285d of the groove 285 are the spaced apart sides of each triangular shaped face 285a, 285b. Providing multiple concentrated load areas for applying the actuation force against the bus bar 105 improves the ability to break the bus bar 105.

Figure 6:
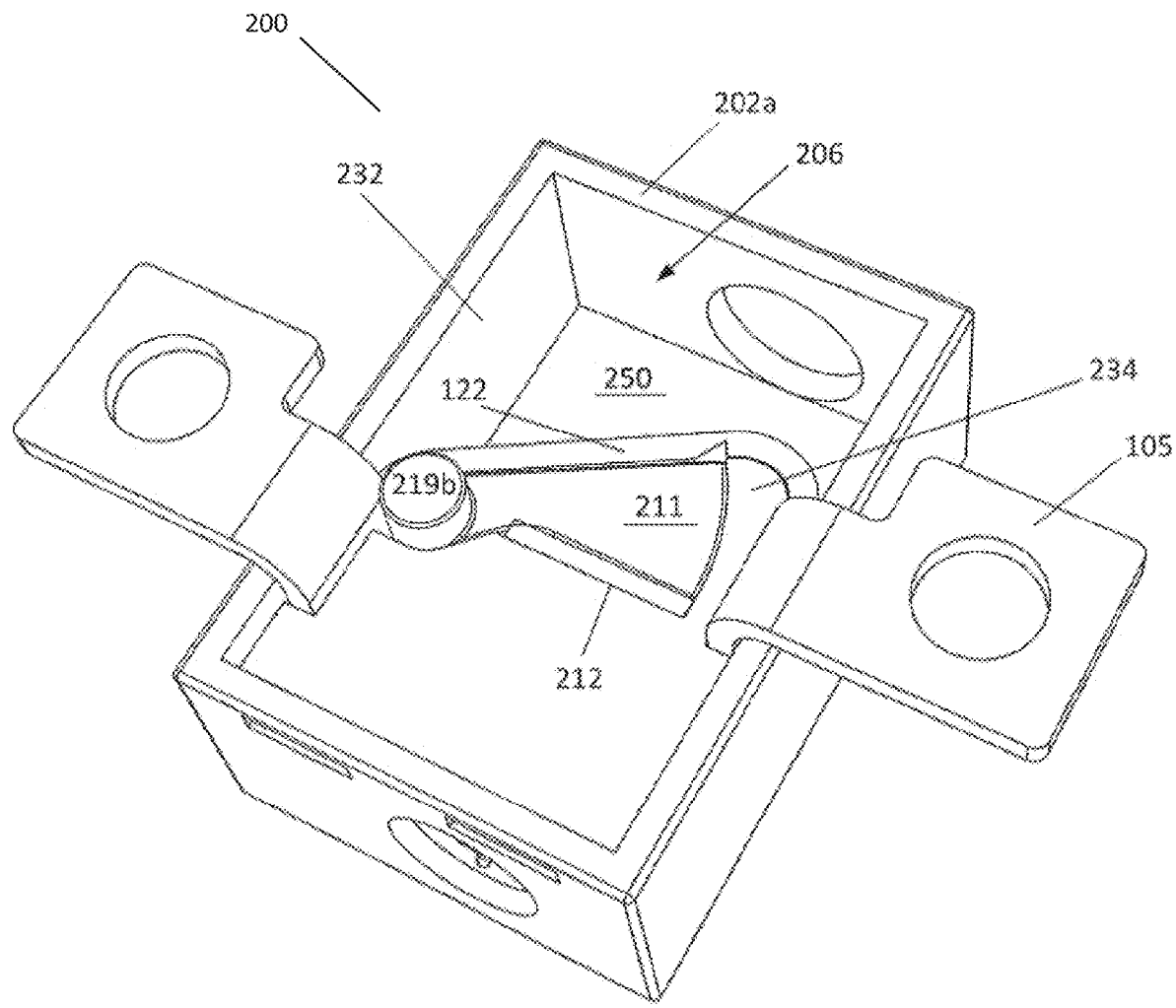
FIG. 6 illustrates a partial perspective view of a battery disconnect device according to another implementation.
Figure 7:
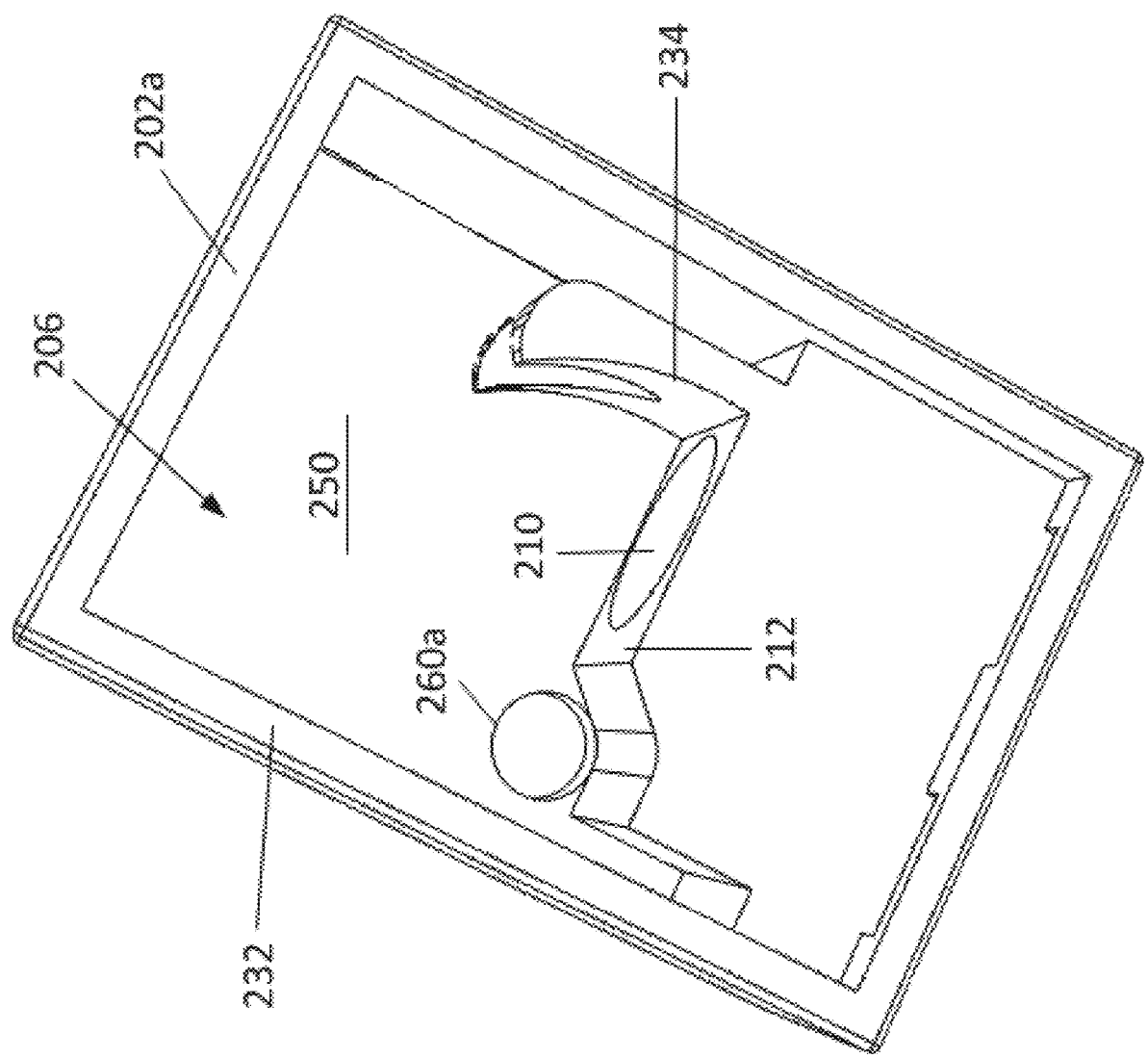
FIG. 7 illustrates a partial perspective view of a first housing portion of the battery disconnect device shown in FIG. 6.

The first housing portion 202a, which is shown in FIGS. 6 and 7, includes inlet wall 212 defining inlet 210, a stop wall 232, a side wall 250, and an arcuate shaped wall 234 that extends from the inlet wall 212 into the chamber 206. Side wall 250 defines a recess 260a.

Figure 8:
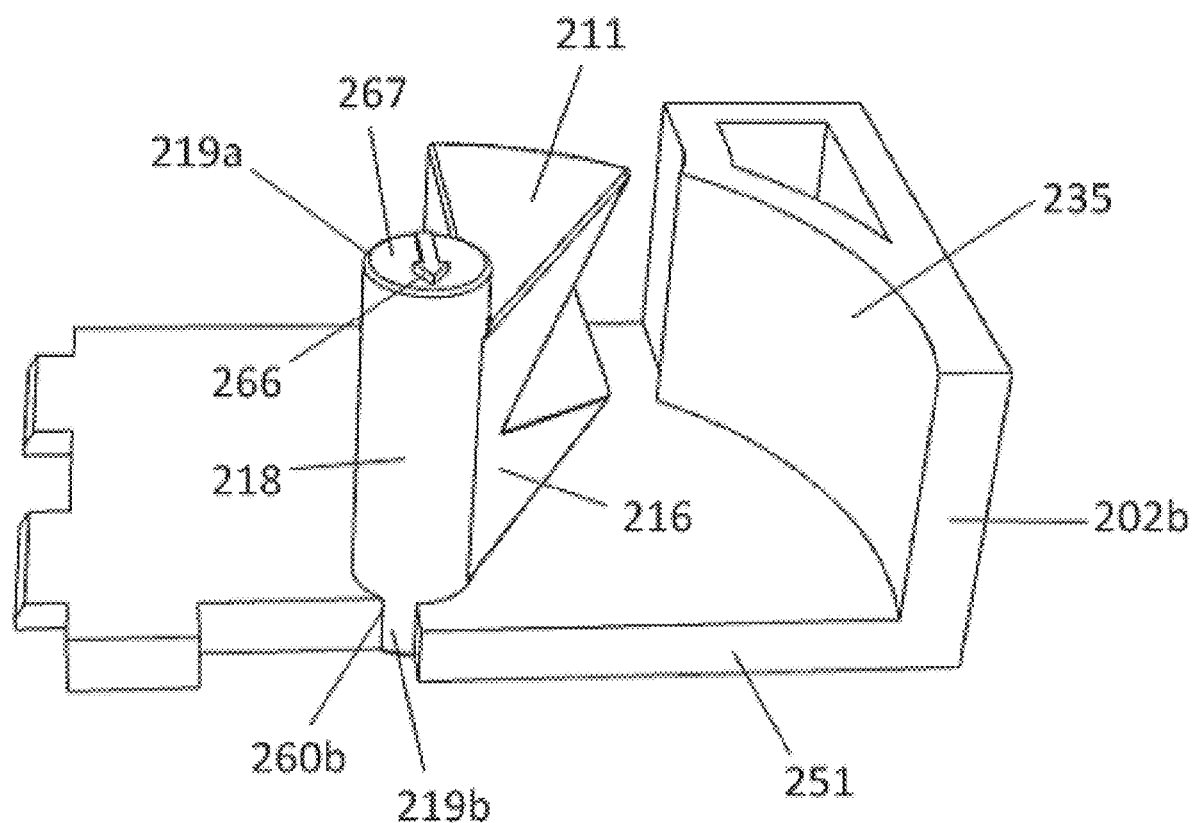
FIG. 8 illustrates a partial perspective view of a second housing portion of the battery disconnect device.
Figure 9:
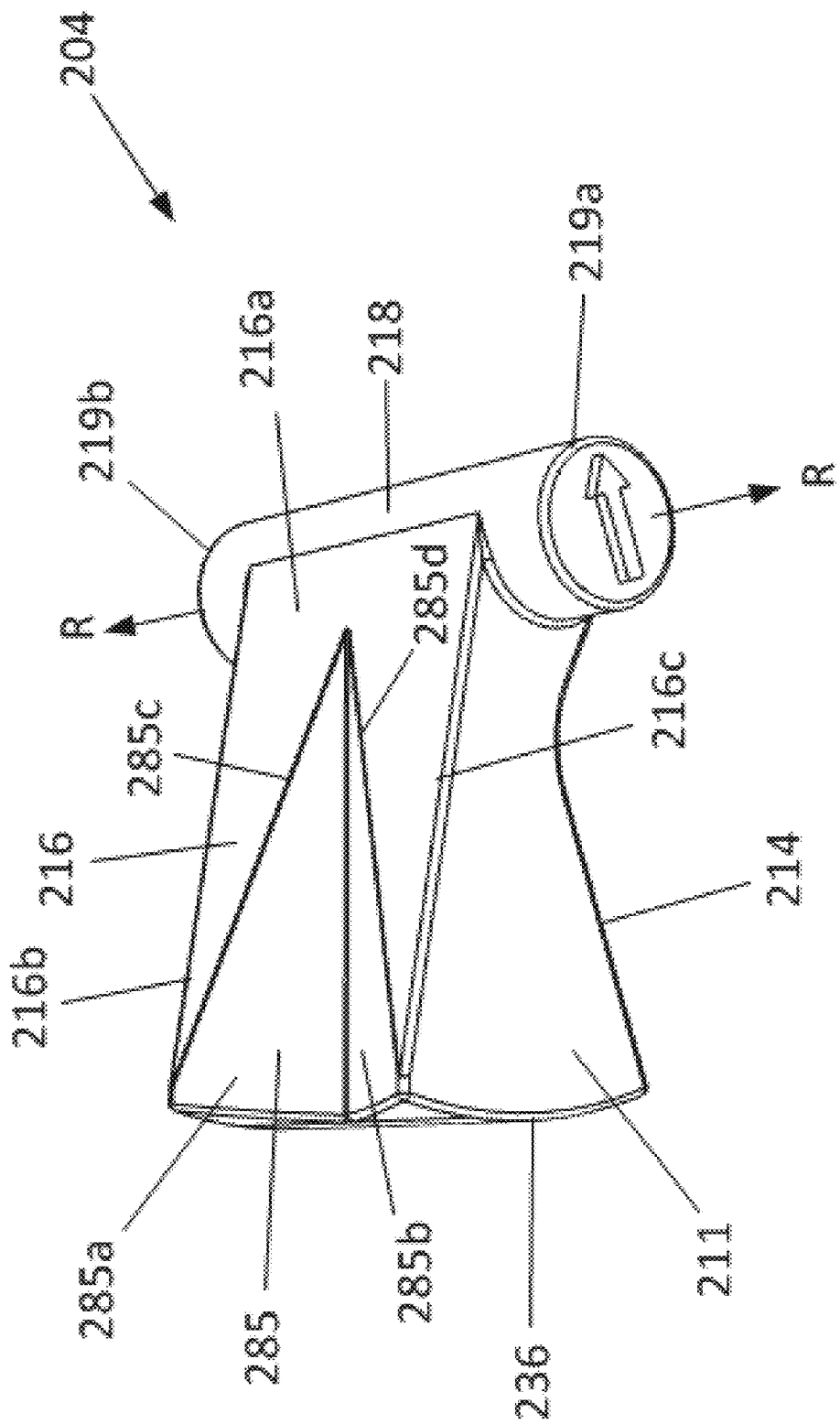
FIG. 9 illustrates a perspective view of the breaker shown in FIG. 6.

The second housing portion 202b, which is shown in FIG. 8, includes a side wall 251 and an arcuate shaped wall 235. The side wall 251 defines a recess 260b.

To assemble the battery disconnect device 200, pin portion 219a of the breaker 204 is engaged into recess 260a, and the disconnect portion 122 of the bus bar 105 is disposed within the chamber 206. The arcuate wall 235 of the second portion 202b of the housing is disposed within chamber 206 such that the arcuate wall 235 is spaced apart from and between a distal edge of arcuate wall 234 of housing portion 202a and the stop wall 232 to define gaps through which the bus bar 105 extends. The pin portion 219b extends through recess 260b. The engagement of the pin portions 219a, 219b in the recesses 260a, 260b allows the breaker 204 to pivot about the axis R-R and restricts lateral movement of the pins 219a, 219b relative to the side walls 250, 251.

Figure 10:
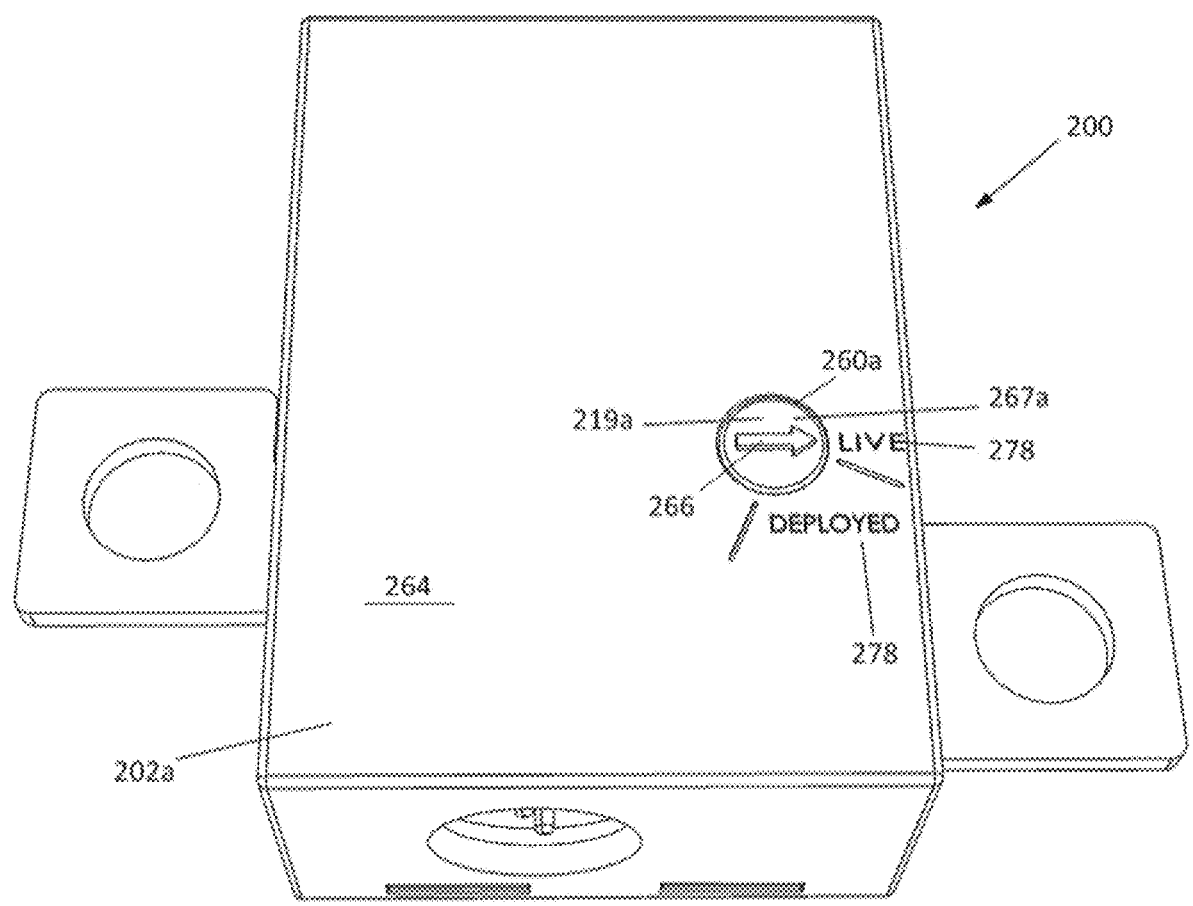
FIG. 10 illustrates a perspective view of the battery disconnect device shown in FIG. 6.

Recess 260a is a window that extends to an outer surface 264 of the sidewall 250, as shown in FIG. 10. As shown in FIG. 10, the pin portion 219a engages recess 260a, and the distal end face 267 of the pin portion 219a includes an arrow shaped indicator 266. The arrow shaped indicator 266 is visible from outside of the housing via the recess 260a. When the breaker 204 pivots from the first position to the second position, the indicator 266 rotates from a first indicator position to a second indicator position with the breaker 204. The first indicator position is shown in FIG. 6, indicating that the breaker 204 is in the first position and the bus bar 105 is not broken. In the second indicator position, the arrow 266 rotates to indicate that the breaker 204 is in the second position and the bus bar is broken. The outer surface 264 of the sidewall 250 of the housing portion 202a adjacent the recess 260a includes indicators 278 that aligns with the arrow shaped indicator 266 on the distal end face of the pin portion 219a in each of the first and second positions and indicates whether the breaker 204 is in the first position or second position. The visual indicators 266, 278 allow emergency responders or others to visually confirm whether power from the battery has been disconnected by the breaker 204.

The various implementations of a battery disconnect device having a pivot portion break the bus bar faster and require less gas volume than prior art solutions that have piston style actuators. In particular, in the implementations shown in FIGS. 1-10, the gas generator is spaced apart from the pivot portion of the breaker, which results in the initial actuation force being applied closer to the predetermined weakest point of the bus bar. Also, according to some implementations, a breaker having the same actuation surface area as a piston style actuator requires half of the gas volume for actuation than is required for the piston style actuator. The battery disconnect device also provides more distance between the broken ends of the bus bar to resist arcing between the broken ends of the bus bar after the breaker is deployed.

Figure 11:
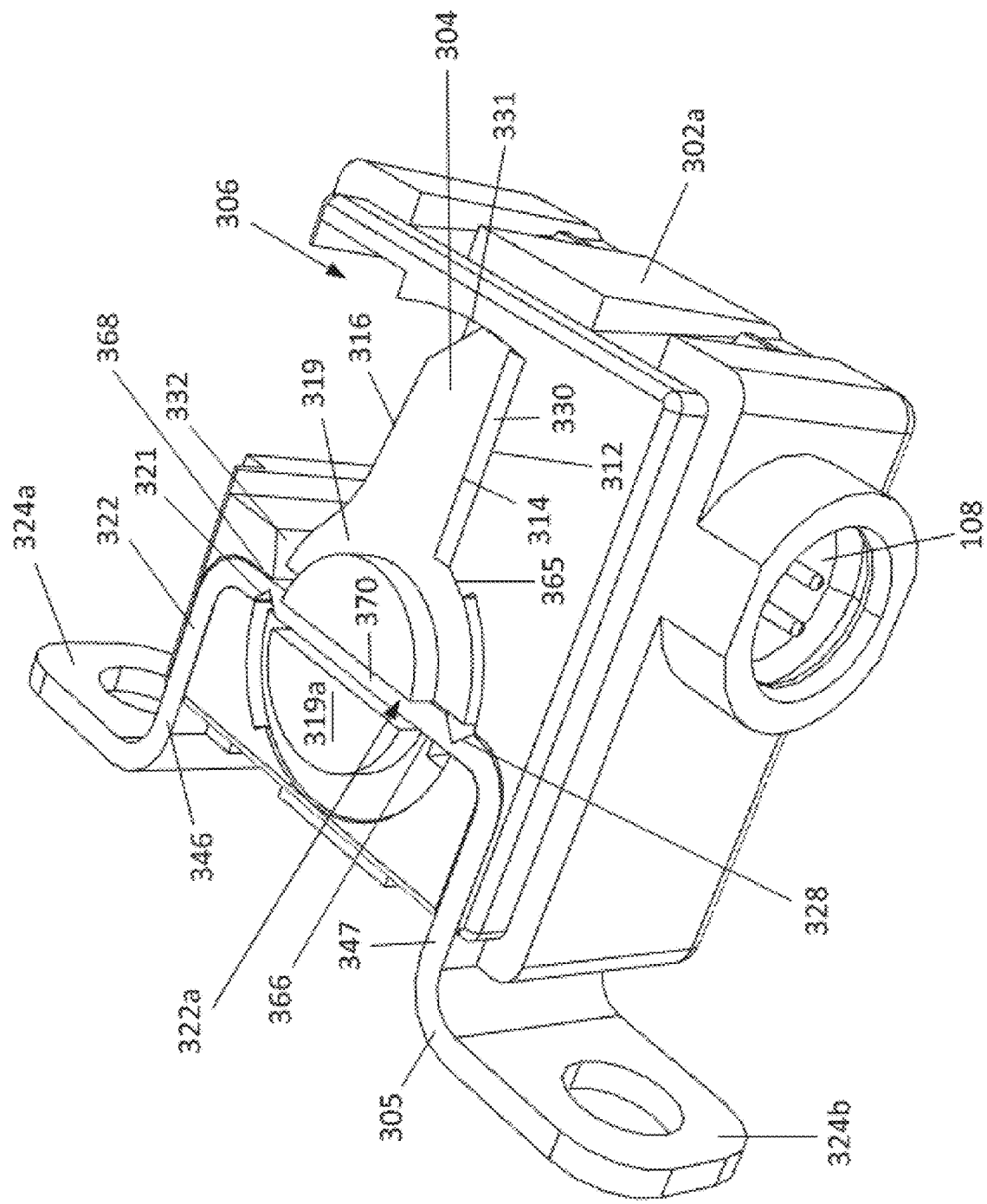
FIG. 11 illustrates a partial perspective view of a battery disconnect device according to another implementation.
Figure 12:
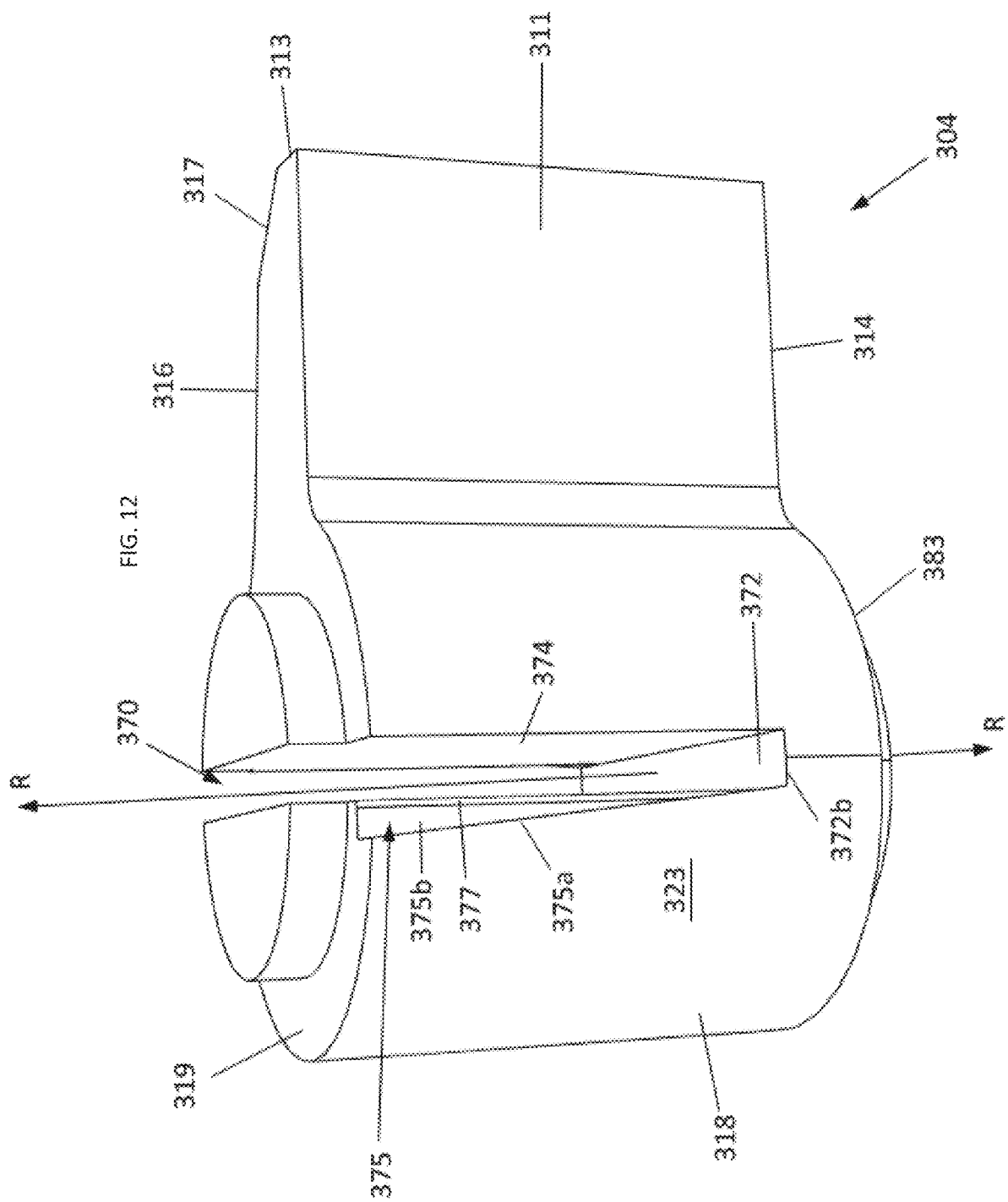
FIGS. 12 and 13 illustrate perspective views of the breaker shown in FIG. 11.
Figure 13:
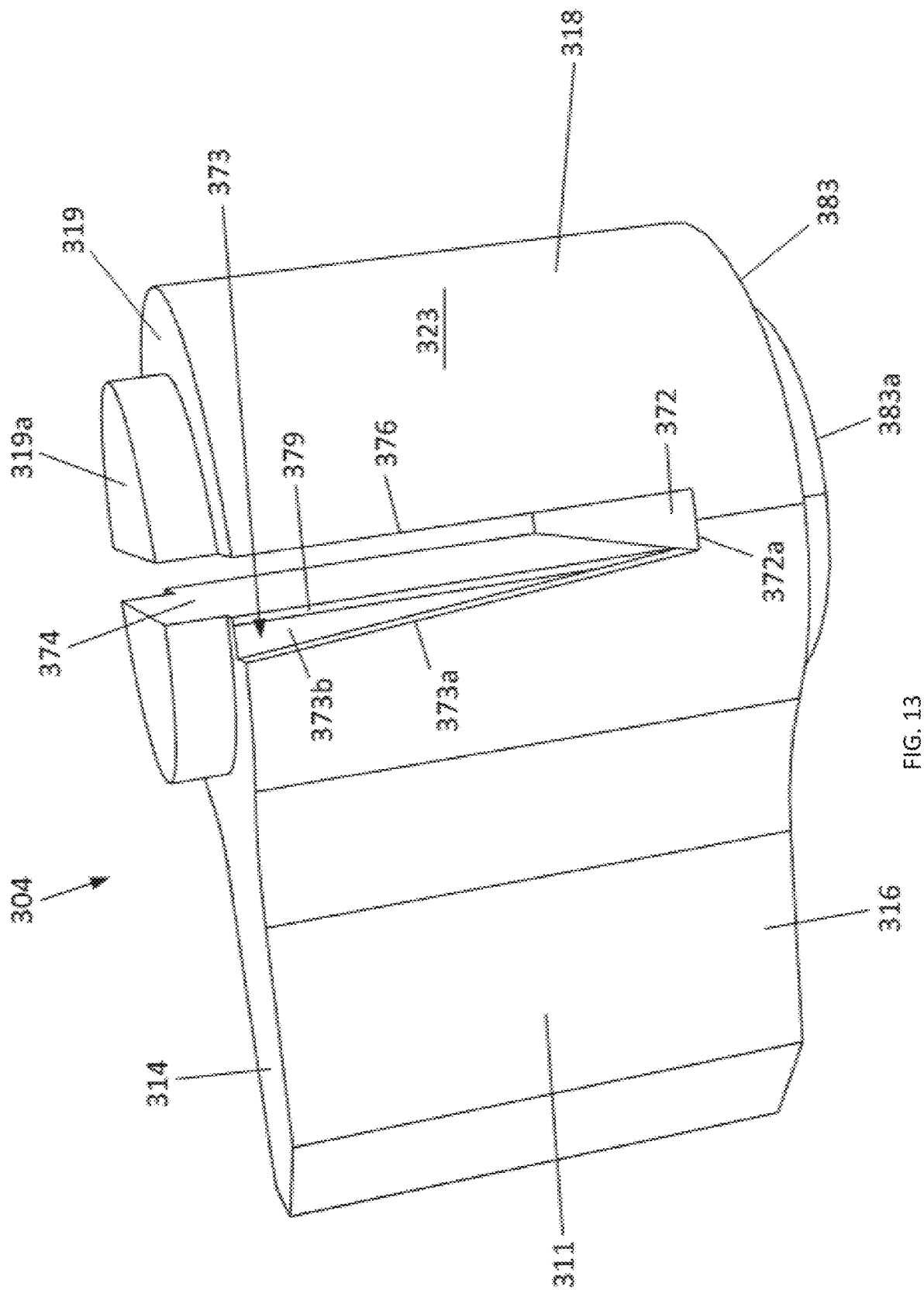

FIGS. 11-18 illustrate another implementation of a battery disconnect device 300. In this implementation, the battery disconnect device 300 includes breaker 304, housing 302, and bus bar 305. As shown in FIGS. 12-13, the breaker 304 includes a cylindrically shaped pivot portion 318 and an actuation portion 311 that extends from an outer radial edge of the pivot portion 318. The pivot portion 318 has a first axial face 319 and a second axial face 383 that is axially spaced apart and opposite the first axial face 319 along axis R-R. A cylindrical side wall 323 extends between the first 319 and second axial faces 383. The first axial face 319 and a portion of the cylindrical side wall 323 define a groove 370 that extends axially into the pivot portion 318. The groove 370 has a first side wall 374 and a second side wall 376 that are spaced apart from each other, and a floor 372 extends between the first 374 and second side walls 376. The groove 370 is centered in the pivot portion 318 such that the axis R-R intersects a center of the groove floor 372. The groove floor 372 is axially spaced apart from the first axial face 319.

As shown in FIGS. 12 and 13, the cylindrical wall 323 and an edge 377 of the second wall 376 adjacent end 372b of the groove floor 372 define an axial groove 375 that extends from the first axial face 319 toward the groove floor 372. The axial groove 375 includes a rectangular shaped face 375a and a triangular shaped face 375b. The triangular shaped face 375b tapers from the first axial face 319 toward the groove floor 372. Adjacent edges of the faces 375a, 375b are coaxial. Similarly, the cylindrical wall 323 and an edge 379 of the first wall 374 adjacent end 372a of the groove floor 372 define an axial groove 373 that extends from the first axial face 319 toward the groove floor 372. The axial groove 373 includes a rectangular shaped face 373a and a triangular shaped face 373b that tapers from the first axial face 319 toward the groove floor 372. Adjacent edges of the faces 373a, 373b are coaxial. The edge 379 of the first wall 374 and the edge 377 of the second wall 376 provide a concentrated load on the portion of the bus bar 305 adjacent each of the edges 379, 377 as the edges 379, 377 come into contact with the bus bar 305. In addition, edges of the cylindrical wall 323 adjacent each groove 373, 375 also provide a concentrated load on the bus bar 305 adjacent these edges as the bus bar 305 elongates and comes into contact with these edges, which further assists with cutting the bus bar 305. During rotation of the pivot portion 318, the pivot portion 318 begins to cut the bus bar 305 at the edge of the bus bar 305 adjacent the groove floor 372, and continued rotation of the pivot portion 318 allows the edges 379, 377 to continue to cut the bus bar 305 through to the edge of the bus bar 305 adjacent the axial face 319. As the pivot portion 318 rotates and begins to cut the bus bar 305, the bus bar 305 elongates slightly at each cut location. The grooves 373, 375 in the pivot portion 318 and the expansion portions 365a, 365b of the semi-cylindrical opening 365 described below allow space for the elongation of the bus bar 305. The ends 372a, 372b of the groove 372 are radially spaced apart from each other. In other implementations, a concentrated load may be applied to the bus bar 305 by an edge of a groove having one or more faces having other shapes (e.g., both rectangular, both triangular, one or more arcuate, one or more trapezoidal).

The actuation portion 311 is wedge shaped and tapers in a radially outward direction. In particular, the actuation portion 311 includes a first face 314, which is an actuation face, and a second face 316. At least a portion of the first face 314 lies in a first plane, and at least a portion of the second face 316 lies in a second plane. The first and second planes intersect at an angle of less than 90° (e.g., between 30 and 45°. The actuation portion 311 also includes a third face 317 and a fourth face 313. At least a portion of the third face 317 extends in a third plane, and the third plane and second plane intersect at an angle at least 90° and less than 180°. At least a portion of the fourth face 313 extends in a fourth plane, and the fourth plane and the first plane intersect at an angle of at least 90° and less than 180°. The third face 317 extends from a distal edge of the second face 316, and the fourth face 313 extends from a distal edge of the first face 314. The third face 317 and fourth face 313 have a common distal edge. However, in other implementations, the actuation portion 311 may be shaped differently. For example, in other implementations, the third 317 and/or fourth faces 313 or may not be wedge shaped, the distal end of the actuation portion 311 may be arcuate shaped, the actuation portion 311 may be rectangular shaped, the actuation portion 311 may defined one or more teeth extending from a distal end thereof, or the actuation portion 311 may have one or more arcuate shaped faces.

In addition, in the implementation shown in FIGS. 11-18, the housing 302 includes a first portion 302a and a second portion 302b. When coupled together, the first portion 302a and second portion 302b define chamber 306. The first portion 302a includes an inlet wall 312, stop wall 332, an arcuate shaped wall 331 extending from the inlet wall 312, and side wall 350, similar to the implementations described above. The second portion 302b includes side wall 351. The first portion 302a and the second portion 302b are separately formed from each other.

To couple the housing portions 302a, 302b together, housing portion 302b includes legs 391a, 391b and legs 392a, 392b that extend axially from side wall 351. The legs 391a, 391b, 392a, 392b engage grooves 393a, 393b, 397a, 397b, respectively, defined on external surfaces of housing portion 302a. Each groove 393a, 393b, 397a, 397b includes a tab 398 that extends outwardly from the respective groove, and a slot 399 defined in each leg receives the tab 398 to prevent the housing portions 302a, 302b from being pulled apart.

The housing portion 302b also includes a wall 334 that extends from side wall 351. The wall 334 includes an outer portion 334d, an inner arcuate shaped portion 334a that defines one or more teeth 334b, and an inner triangular portion 334c spaced apart from the inner arcuate shaped surface 334a.

The teeth 334b engage the distal end of the actuation portion 311 of the breaker 304 to prevent the breaker 304 from rotation opposite the actuation direction. Side wall 350 of housing portion 302a defines a first triangular shaped opening 355, a second triangular shaped opening 352, and a rectangular shaped groove 353 within side wall 354, which extends from side wall 350. When coupling the housing portions 302a, 302b together, the outer portion 334d of wall 334 engages the groove 353, a distal end of the inner arcuate shaped portion 334a engages the second triangular shaped opening 352, and a distal end of the inner triangular shaped portion 334c engages the first triangular shaped opening 355. Engagement of the portions 334a, 334c, 334d of the housing portion 302b into the respective openings 352, 355 and groove 353 of the housing portion 302a provides stability to the housing 302 during operation.

The first portion 302a of the housing 302 defines a semi-cylindrical opening 365 into which the pivot portion 318 is disposed. The semi-cylindrical opening 365 is defined by and between the inlet wall 312 and the stop wall 332. The opening 365 has first 365a and second enlarged opening portions 365b and a non-enlarged opening portion 365c. The first 365a and second enlarged opening portions 365b have a diameter that is larger than the non-enlarged opening portion 365c. The inlet wall 312 defines the first enlarged opening portion 365a, and the stop wall 332 defines the second enlarged opening portion 365b. The arcuate length and diameter of each enlarged opening portion 365a, 365b is selected to provide sufficient space for the elongation of the bus bar 305 when it is broken.

Figure 14:
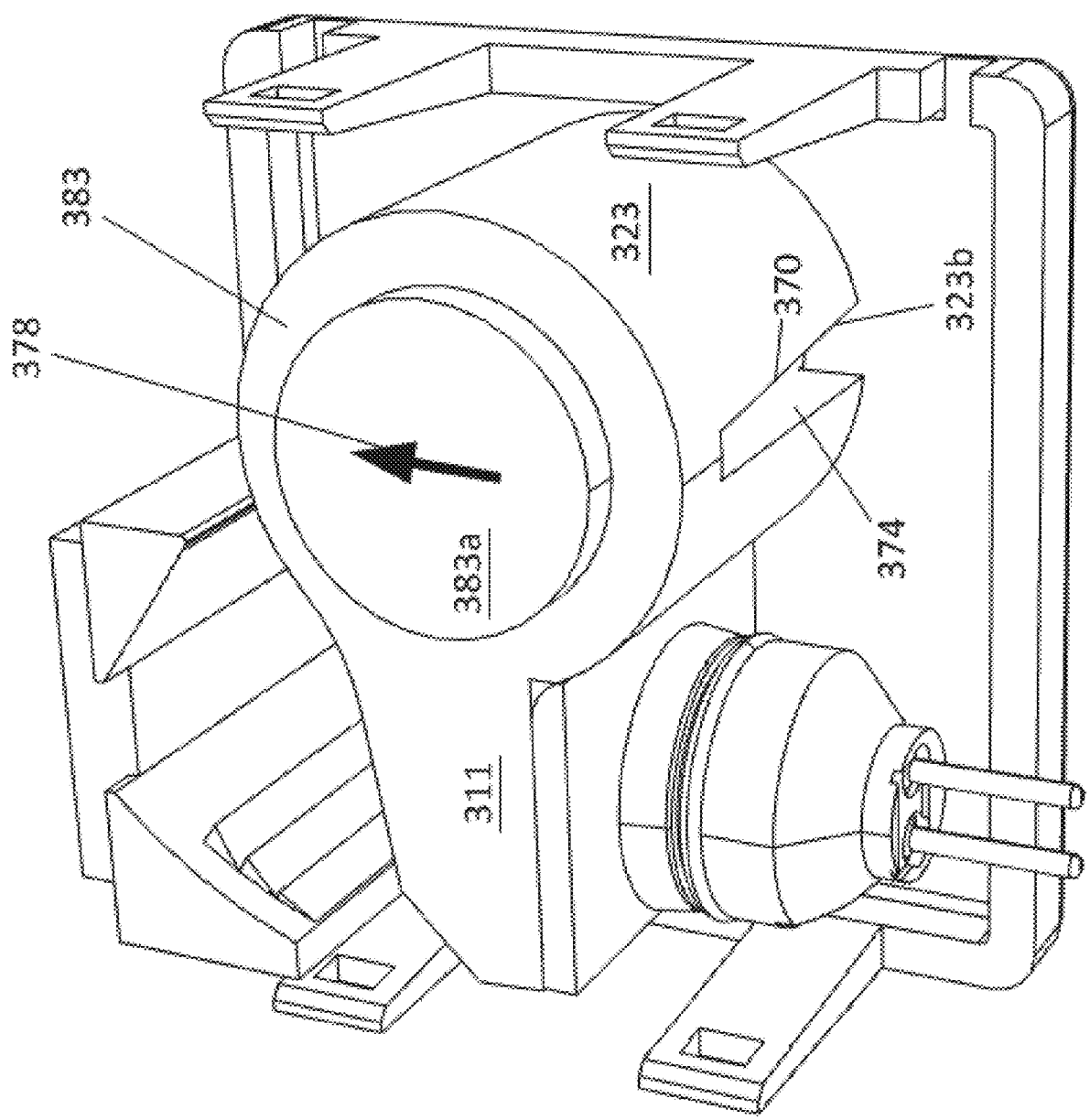
FIG. 14 illustrates a partial perspective view of the breaker shown in FIGS. 12 and 13 and a second housing portion.
Figure 15:
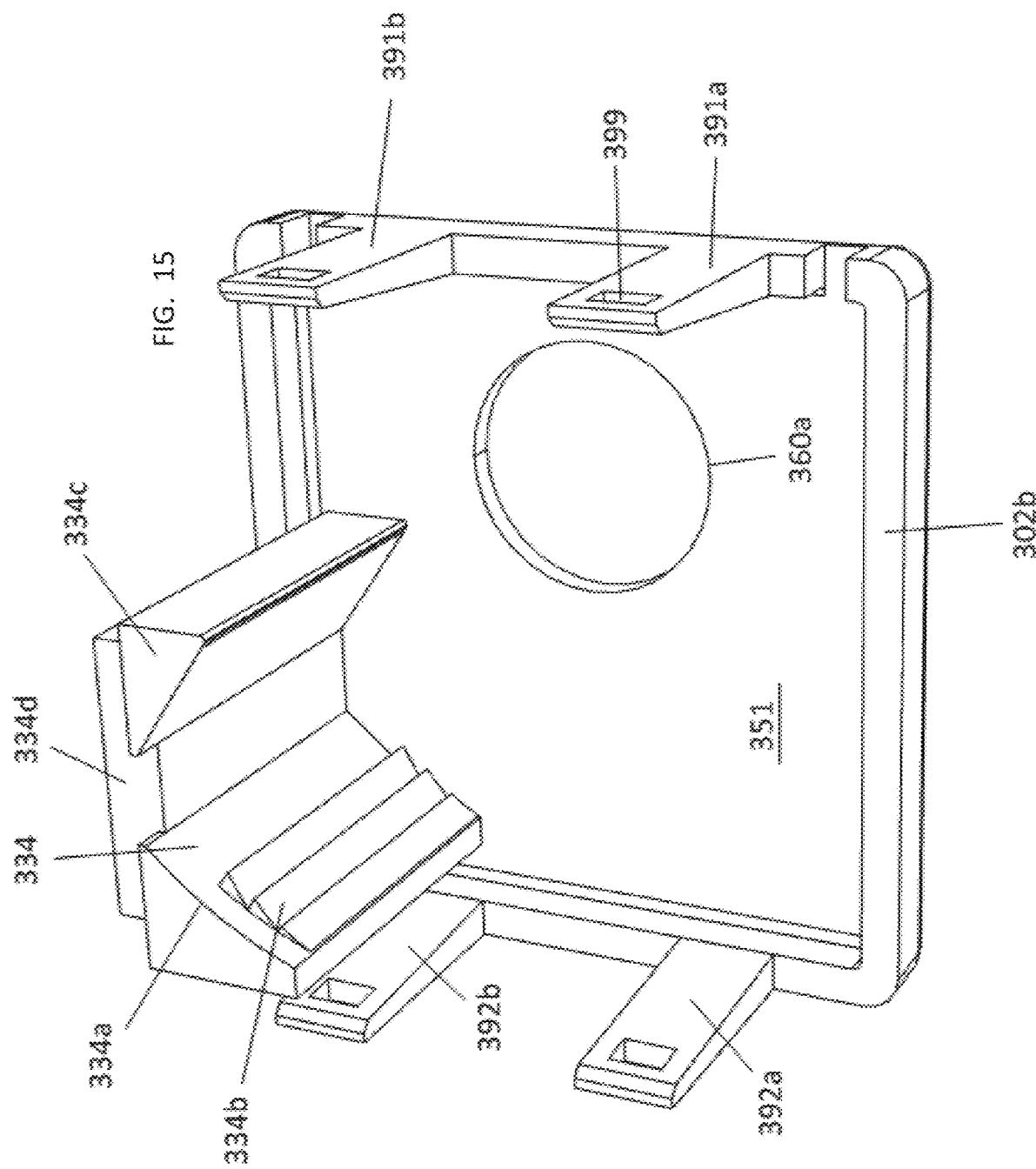
FIG. 15 illustrates the second housing portion shown in FIG. 14.
Figure 16:
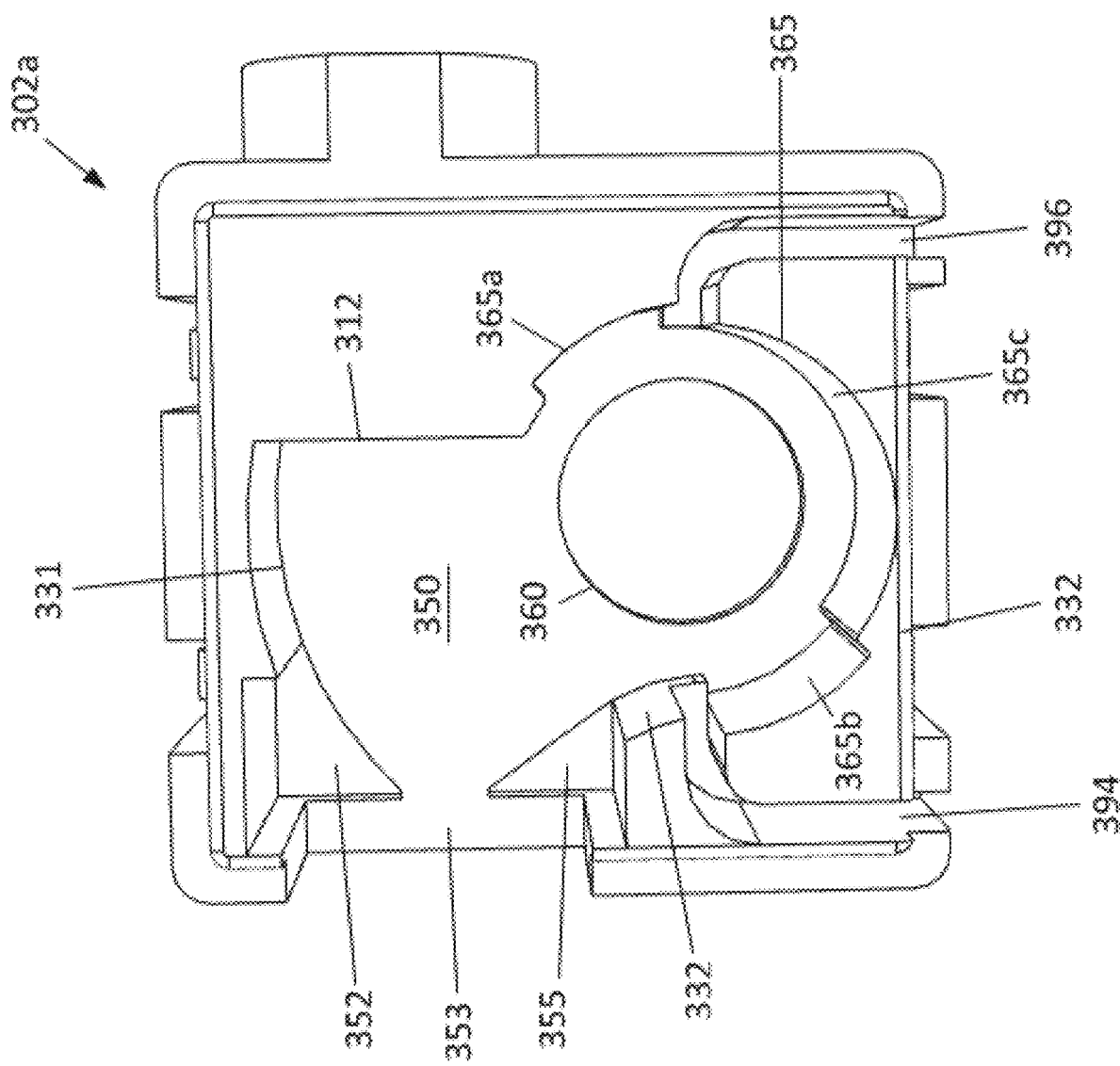
FIG. 16 illustrates a plan view of a first housing portion, which is also shown in FIG. 11.
Figure 17:
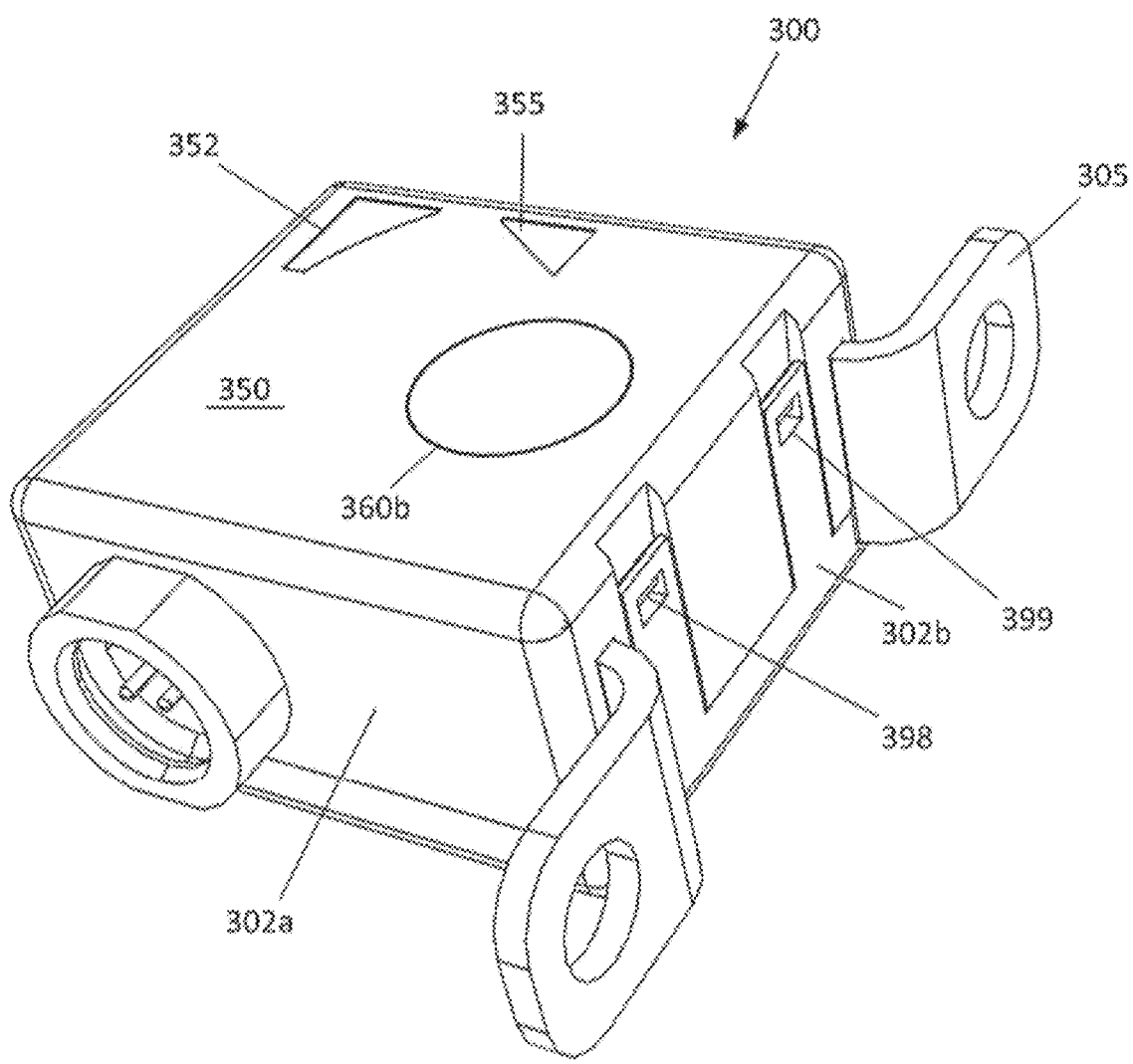
FIG. 17 illustrates the assembled battery disconnect device 300 shown in FIGS. 11-16.

The side wall 351 defines a first recess 360a, and the side wall 350 defines a second recess 360b. The first axial face 319 of the pivot portion 318 includes a pin portion 319a that extends axially from the first axial face 319, and the pin portion 319a is engaged in the first recess 360a when the first portion 302a and the second portion 302b of the housing 302 are coupled together. The second axial face 383 includes a pin portion 383a that extends axially from the second axial face 383, and the pin portion 383a is engaged in the second recess 360b. Having the pin portions 319a, 383a engage the recesses 260a, 260b allows pivoting movement of the breaker 304 and prevents lateral movement of the breaker 304 relative to axis R-R. In the implementation shown in FIG. 16, at least recess 360b is an opening defined in the side wall 350, and the distal face of the second pin portion 383a is visible through the opening 360b from outside the housing 302. The distal face of the first pin portion 383a includes an indicator 378 thereon that indicates whether the breaker 304 is in the first position or the second position. The indicator 378 shown in FIG. 14 is an arrow, but in other implementations, the indicator could be a line or other shape. In another implementation, the recess 360b is a window, and the orientation of the breaker 304 is visible from outside of the housing 302 through this window.

The bus bar 305 includes a U-shaped interior portion 322, a first electrical lead 324a, and a second electrical lead 324b. The U-shaped interior portion 322 has a first distal end 346, a second distal end 347 and a disconnect portion 322a. The disconnect portion 322a includes a first recessed portion 321 and a second recessed portion 328. The first electrical lead 324a extends from the first distal end 346 of the interior portion 322, and the second electrical lead 324b extends from the second distal end 347 of the interior portion 322. In the implementation shown in FIG. 11, the leads 324a, 324b extend outwardly from the interior portion 322 at 90°. However, in other implementations, the angle at which the leads 324a, 324b extend from the distal ends 346, 347 may differ, depending on the arrangement of the battery disconnect device 300 in its end use. Lead 324a extends from the housing 302 through a groove 394 defined in stop wall 332, and lead 324b extends from the housing 302 from a groove 396 defined between stop wall 332 and inlet wall 312.

The disconnect portion 322a is between the distal ends 346, 347. In particular, the disconnect portion 322a is defined between a first recessed portion 321 defined on a first surface 366 of the bus bar 305 and a second recessed portion 328 defined on a second surface 368 of the bus bar 305. The first surface 366 and the second surface 368 are spaced apart from and opposite each other. The first recessed portion 321 and the second recessed portion 328 are also spaced apart along a length of the disconnect portion 322a. The recessed portions 321, 328 shown in FIG. 11 are V-shaped, but in other implementations, the recessed portions 321, 328 may be shaped differently (e.g., U-shaped or rectangular shaped).

As shown in FIG. 11, the disconnect portion 322a is disposed within the groove 370 of the breaker 304. A first edge of the bus bar 305 is disposed adjacent to (e.g., abuts) the floor 372 of the groove 370. A second edge of the bus bar 305 that is opposite and spaced apart from the first edge is within the same plane or below the same plane that includes the axial face 319.

In the first or non-deployed position, which is shown in FIGS. 11 and 14, the first face 314 of the actuation portion 311 faces and is adjacent the inlet 310 and the inlet wall 312 of the housing 302. Gasket 330 is disposed between the first face 314 and the inlet wall 312. The second face 316 faces away from the inlet wall 312. Pin portions 319a, 383a are engaged within recesses 360a, 360b, respectively.

Figure 18:
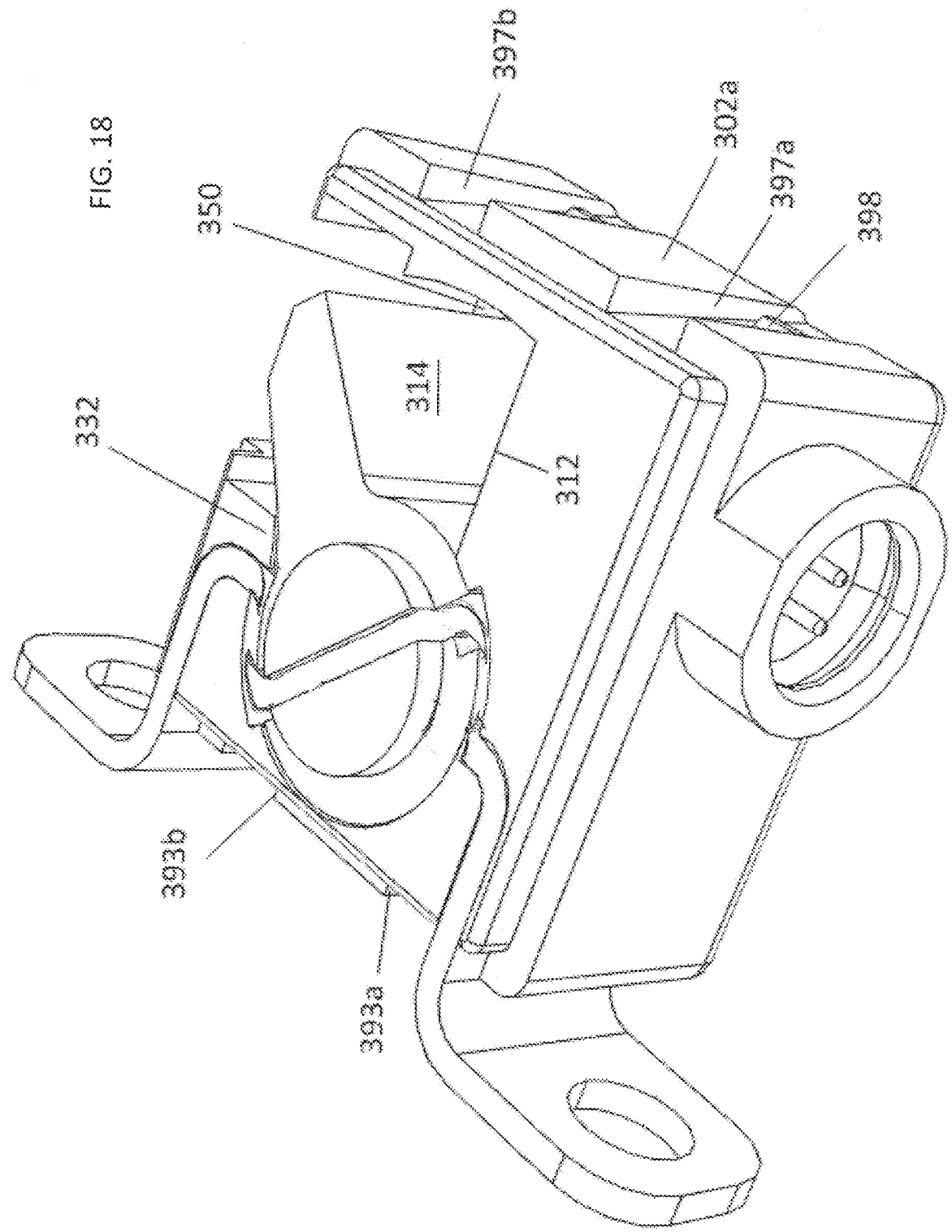
FIG. 18 illustrates a partial perspective view of the battery disconnect device shown in FIG. 11 with the bus bar broken.

Combustion gas from the gas generator 108 enters chamber the 306 from the inlet 310 and forces the breaker 304 to pivot about axis R-R from the first position to a second position. In the second position, which is shown in FIG. 18, the first face 314 is spaced apart from the inlet wall 312. The gasket 330 moves with the first face 314 but is not shown in FIG. 18. The pivoting movement of the pivot portion 318 causes the pivot portion 318 to break the bus bar 305 at the first recessed portion 321 and the second recessed portion 328. During the pivoting movement, the edges 379, 377 of walls 374, 376, respectively, of the groove 370 push against surfaces of the bus bar 305 opposite the first recessed portion 321 and the second recessed portion 328, respectively, causing the bus bar 305 to break at or adjacent to the recessed portions 321, 328. Because the indicator 378 on the distal end of the pin portion 383a rotates with the pivot portion 318 as the breaker 304 moves from the first position to the second position, the indicator 378 indicates whether the bus bar 305 is in tact or broken.

In the implementations described above in relation to FIGS. 6-18, the breaker rotates from a first position to a second position to break the bus bar, and an indicator on the pin portion of the pivot portion rotates with the pivot portion to indicate the position of the breaker within the housing. The indicator is visible from an external surface of the housing, allowing emergency personnel or others to visually determine if the bus bar is live or broken. However, in other implementations, the ability to view the status of the bus bar is provided in alternative ways. For example, the housing may define a window through which a portion of the breaker and/or a portion of the bus bar is visible when the breaker is in one position and not visible in the other position.

Figure 19:
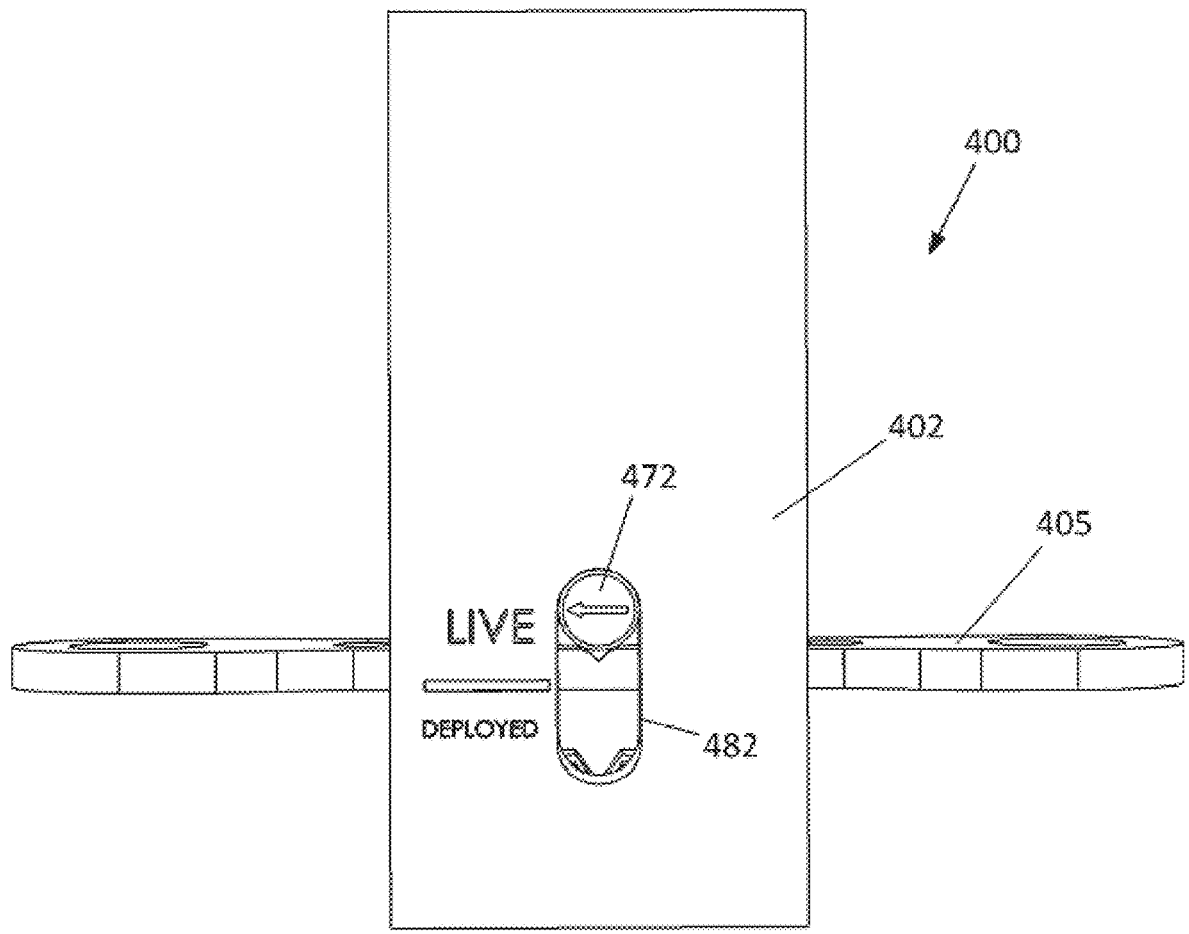
FIG. 19 illustrates a linear actuator type disconnect device according to another implementation.
Figure 20:
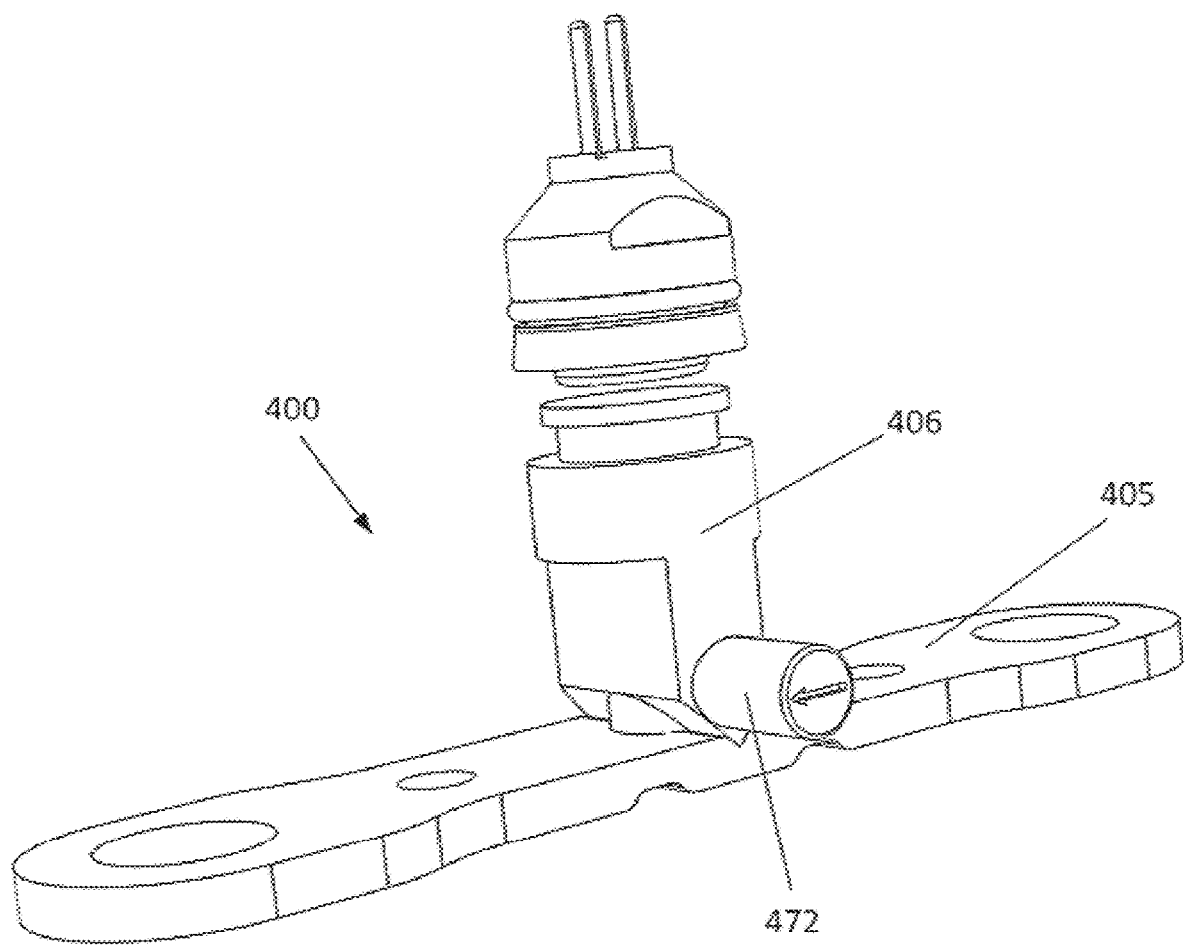
FIG. 20 illustrates a partial perspective view of the disconnect device shown in FIG. 19.

This ability to view the status of the bus bar may also be provided with linear actuators for breaking bus bars, according to various implementations. For example, as shown in FIGS. 19-20, the linear actuator battery disconnect device 400 includes a piston rod 406, housing 402, and bus bar 405. The piston rod 406 is disposed within the housing 402, and the bus bar 405 extends through the housing 402. An indicator tab 472 extends radially outwardly from an external surface of the piston rod 406 and into a slot 482 defined by one side of the housing 402. The slot 482 extends to the external surface of the side of the housing 402, allowing the position of the tab 472 in the slot 482 to be viewed from outside of the housing 402. When the piston rod 406 is moved from a first position to a second position to break the bus bar 405, the tab 472 moves axially through the slot 482 from a first end of the slot 482 toward a second end of the slot 482. In the implementation shown in FIGS. 19-20, an intact bus bar 405 and the tab 472 are visible in the first position, but the bus bar 405 would not be visible in the second position.

Figure 21:
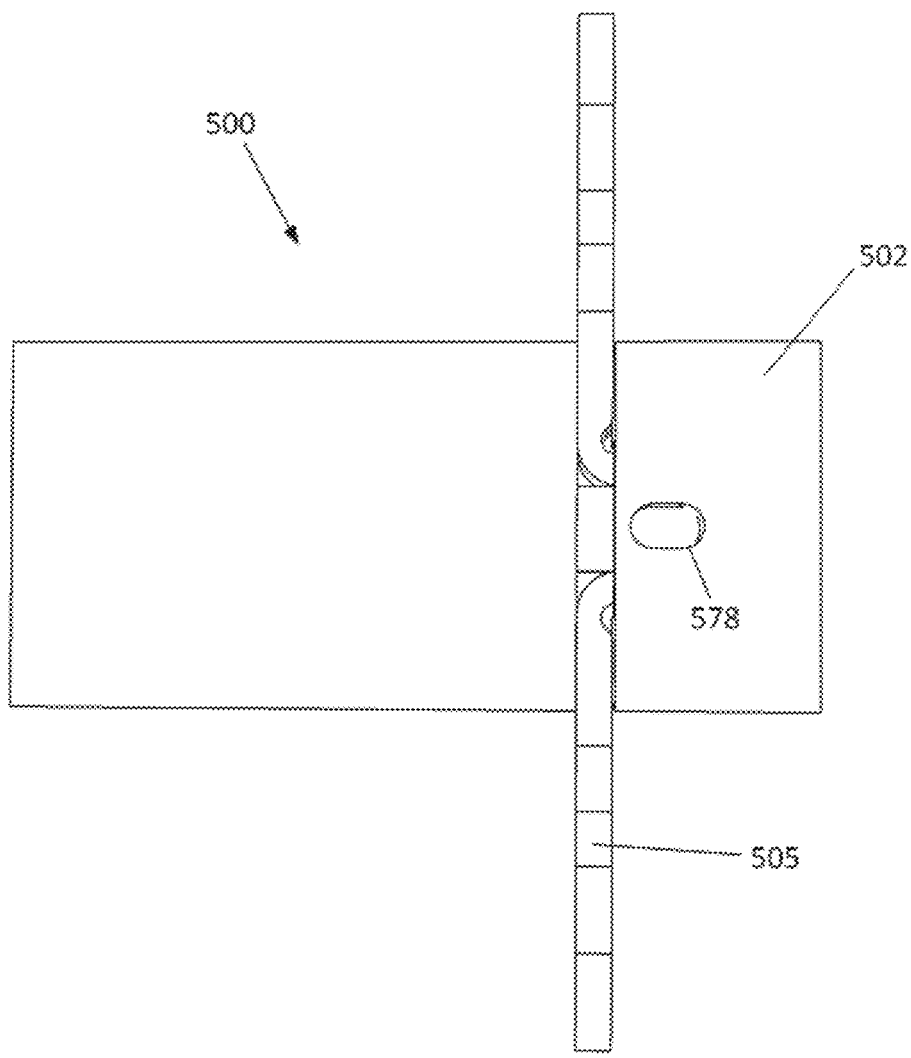
FIG. 21 illustrates a linear actuator type disconnect device according to another implementation.
Figure 22:
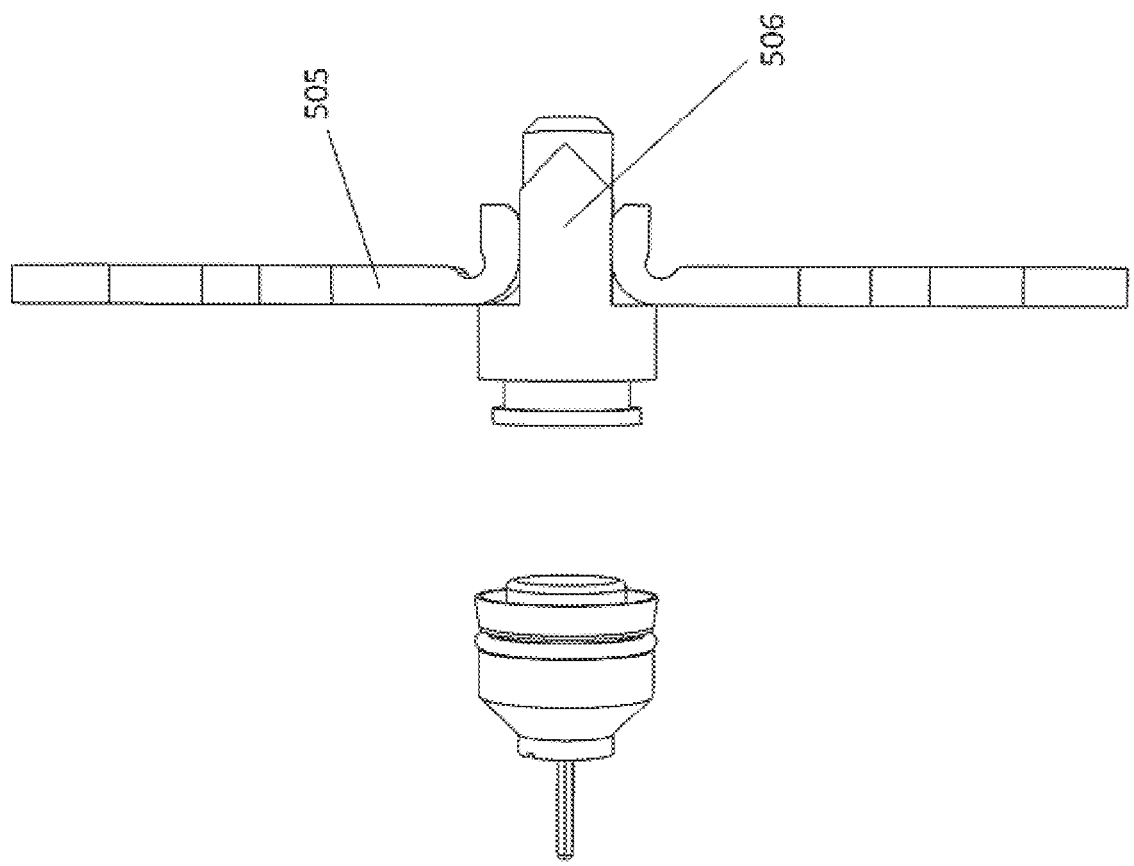
FIG. 22 illustrates a partial perspective view of the disconnect device shown in FIG. 21.

Alternatively, in the implementation shown in FIGS. 21-22, the linear actuator battery disconnect device 500 includes piston rod 506, housing 502, and bus bar 505. The piston rod 506 does not have an indicator tab as with battery disconnect device 400, but at least one side wall of the housing 502 defines a window 578 through which at least a portion of the piston rod 506 and/or bus bar 505 are visible from outside of the housing 502. In the implementation shown, the piston rod 506 is not visible from the window 578 in the first position and is visible from the window 578 in the second position, indicating that the bus bar is broken. However, in other implementations, the window 578 may be defined such that a portion of the bus bar 505 is visible from the window 578 in one position but not the other.

The terminology used herein is for the purpose of describing particular implementations only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The implementation was chosen and described in order to best explain the principles of the invention and the practical application, and to enable others of ordinary skill in the art to understand the invention for various implementations with various modifications as are suited to the particular use contemplated.

The invention claimed is:

1. A battery disconnect device comprising:
a breaker having an indicator on a portion thereof;
a housing defining a chamber, the breaker being disposed in the chamber; and
a bus bar disposed through the housing,
wherein combustion gas from a gas generator causes the breaker to move from a first position to a second position, wherein movement from the first position to the second position causes the breaker to break the bus bar into at least two separate pieces, and the indicator is visible from an external surface of the housing when the breaker is in the second position;
wherein the breaker has a pivot portion and an actuation portion, the actuation portion having an actuation face, the pivot portion having an axis of rotation about which the breaker is pivotable, wherein the chamber is in fluid communication with a gas generator via an inlet defined by an inlet wall of the housing, the bus bar extending through the housing and the chamber, wherein the actuation face is adjacent the inlet and inlet wall in the first position, and combustion gas from the gas generator pushes on the actuation face to cause the breaker to pivot about the axis of rotation of the pivot portion to a second position, wherein in the second position, the actuation face is spaced apart from the inlet and inlet wall; and
wherein the bus bar extends through a groove defined in the pivot portion of the breaker, and the pivoting movement of the pivot portion causes the pivot portion to break the bus bar at a first recessed portion and a second recessed portion.

2. The battery disconnect device of claim 1, wherein the indicator is visible from the external surface of the housing when the breaker is in the first position.

3. The battery disconnect device of claim 1, wherein the indicator is a tab that extends from an external surface of the breaker, the tab moving with the breaker from the first position to the second position, and the tab being visible from the external surface of the housing through a window defined by the external surface of the housing.

4. The battery disconnect device of claim 3, wherein the tab is an axial face of the pivot portion of the breaker, and the tab comprises an indicator that rotates with the pivot portion about the axis of rotation of the pivot portion to indicate whether the breaker is in the first position or the second position.

5. The battery disconnect device of claim 1, wherein the groove has first and second walls that are spaced apart from each other, and an edge of a first wall and a cylindrical wall of the pivot portion define a first axial groove, and an edge of the second wall and the cylindrical wall define a second axial groove, wherein the first axial groove and the second axial groove are circumferentially spaced apart from each other.

6. The battery disconnect device of claim 1, wherein the groove has a floor, and one edge of the bus bar is disposed adjacent the groove floor.

7. The battery disconnect device of claim 1, wherein the pivot portion further has a second axial face, and the housing defines a first recess on a first wall and a second recess on a second wall, the first wall and the second wall being spaced apart from each other, and wherein at least a portion of the first axial face is engaged in the first recess and at least a portion of the second axial face is engaged in the second recess.

8. The battery disconnect device of claim 7, wherein at least one of the first recess or the second recess is an opening in the respective first or second wall of the housing, and the respective first or second axial face is visible through the opening from outside the housing.

9. The battery disconnect device of claim 8, wherein the visible first or second axial face comprises the indicator thereon, the indicator indicating whether the breaker is in the first position or the second position.

10. The battery disconnect device of claim 1, wherein the housing comprises a wall that defines an opening, and at least a portion of the bus bar and/or breaker is visible through the opening.

11. The battery disconnect device of claim 1, wherein the pivot portion is cylindrically shaped, and the actuation portion extends from a portion of a cylindrical wall of the cylindrically shaped pivot portion.

12. The battery disconnect device of claim 11, wherein the actuation portion is wedge shaped and tapers in a radially outward direction from the cylindrical wall.

13. The battery disconnect device of claim 1, wherein the bus bar comprises a first lead and a second lead, the first and second leads extend outwardly relative to an external surface of the housing.

14. A battery disconnect device comprising:
a breaker having an indicator on a portion thereof;
a housing defining a chamber, the breaker being disposed in the chamber; and
a bus bar disposed through the housing,
wherein combustion gas from a gas generator causes the breaker to move from a first position to a second position, wherein movement from the first position to the second position causes the breaker to break the bus bar into at least two separate pieces, and the indicator is visible from an external surface of the housing when the breaker is in the second position,
wherein the breaker has a pivot portion and an actuation portion, the actuation portion having an actuation face, the pivot portion having an axis of rotation about which the breaker is pivotable, wherein the chamber is in fluid communication with a gas generator via an inlet defined by an inlet wall of the housing, the bus bar extending through the housing and the chamber, wherein the actuation face is adjacent the inlet and inlet wall in the first position, and combustion gas from the gas generator pushes on the actuation face to cause the breaker to pivot about the axis of rotation of the pivot portion to a second position, wherein in the second position, the actuation face is spaced apart from the inlet and inlet wall,
wherein:
the actuation face lies in a first plane and a second face lies in a second plane,
the inlet wall of the chamber lies in a third plane,
the housing further comprises a stop wall that lies in a fourth plane and an arcuate shaped wall disposed between the stop wall and the inlet wall, the third and fourth planes intersecting opposite the arcuate shaped wall of the housing,
the breaker comprises an arcuate shaped face extending between the actuation face and the second face, the arcuate shaped face being opposite and spaced apart from the pivot portion,
the arcuate shaped wall of the chamber faces the arcuate shaped face of the breaker, and
the pivot portion of the breaker is disposed adjacent the intersection of the third and fourth planes,
wherein the arcuate shaped face of the breaker comprises at least one tooth that extends away from the arcuate shaped face, the tooth engaging the arcuate shaped wall after the breaker rotates from the first position to the second position to prevent rotation from the second position to the first position, and
wherein the at least one tooth comprises a first plurality of teeth and the arcuate shaped wall defines a second plurality of teeth that extend away from the arcuate shaped wall and engage the first plurality of teeth after the breaker rotates from the first position to the second position to prevent rotation from the second position to the first position.

15. The battery disconnect device of claim 14, wherein an angle of intersection of the first and second planes is less than 90°.

* * * * *